US008379313B2

United States Patent
Shimomura

(10) Patent No.: US 8,379,313 B2
(45) Date of Patent: Feb. 19, 2013

(54) OPTICAL SCANNING APPARATUS

(75) Inventor: Hidekazu Shimomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 12/947,633

(22) Filed: Nov. 16, 2010

(65) Prior Publication Data

US 2011/0115873 A1    May 19, 2011

(30) Foreign Application Priority Data

Nov. 18, 2009  (WO) .................. PCT/JP2009/069570

(51) Int. Cl.
*G02B 27/14* (2006.01)
*B41J 2/47* (2006.01)
*B41J 27/00* (2006.01)
(52) U.S. Cl. .................... 359/629; 347/239; 347/256
(58) Field of Classification Search .................. 347/239, 347/256; 359/629
See application file for complete search history.

(56) References Cited

U.S. PATENT DOCUMENTS 5,691,761 A    11/1997  Fisli 6,522,442 B2 *  2/2003  Ohno et al. ................. 359/204.1
2009/0231557 A1    9/2009  Kubo

FOREIGN PATENT DOCUMENTS

| JP | 08-227050 A | 9/1996 |
| JP | 2001-350114 A | 12/2001 |
| JP | 2006-330581 A | 12/2006 |
| JP | 2008-076586 A | 4/2008 |
| JP | 2009-223026 A | 10/2009 |

* cited by examiner

*Primary Examiner* — Stephen Meier
*Assistant Examiner* — Sarah Al Hashimi
(74) *Attorney, Agent, or Firm* — Canon U.S.A., Inc. IP Division

(57) ABSTRACT

An image scanning apparatus includes a beam splitter disposed between a deflection surface and surfaces to be scanned. The beam splitter is formed of reflective surfaces and transmissive surfaces. One transmissive surface is disposed between the reflective surfaces in the sub-scanning direction, and an optical path of light beams reaching surfaces to be scanned that are physically closer to the deflection surface than a surface to be scanned located at the position physically farthest from the deflection surface between the reflective surfaces intersects with an optical path of a light beam reaching the surface to be scanned located at a position physically farthest from the deflection surface between the deflection surface and the transmissive surface in a sub-scanning cross section in the beam splitter.

9 Claims, 13 Drawing Sheets

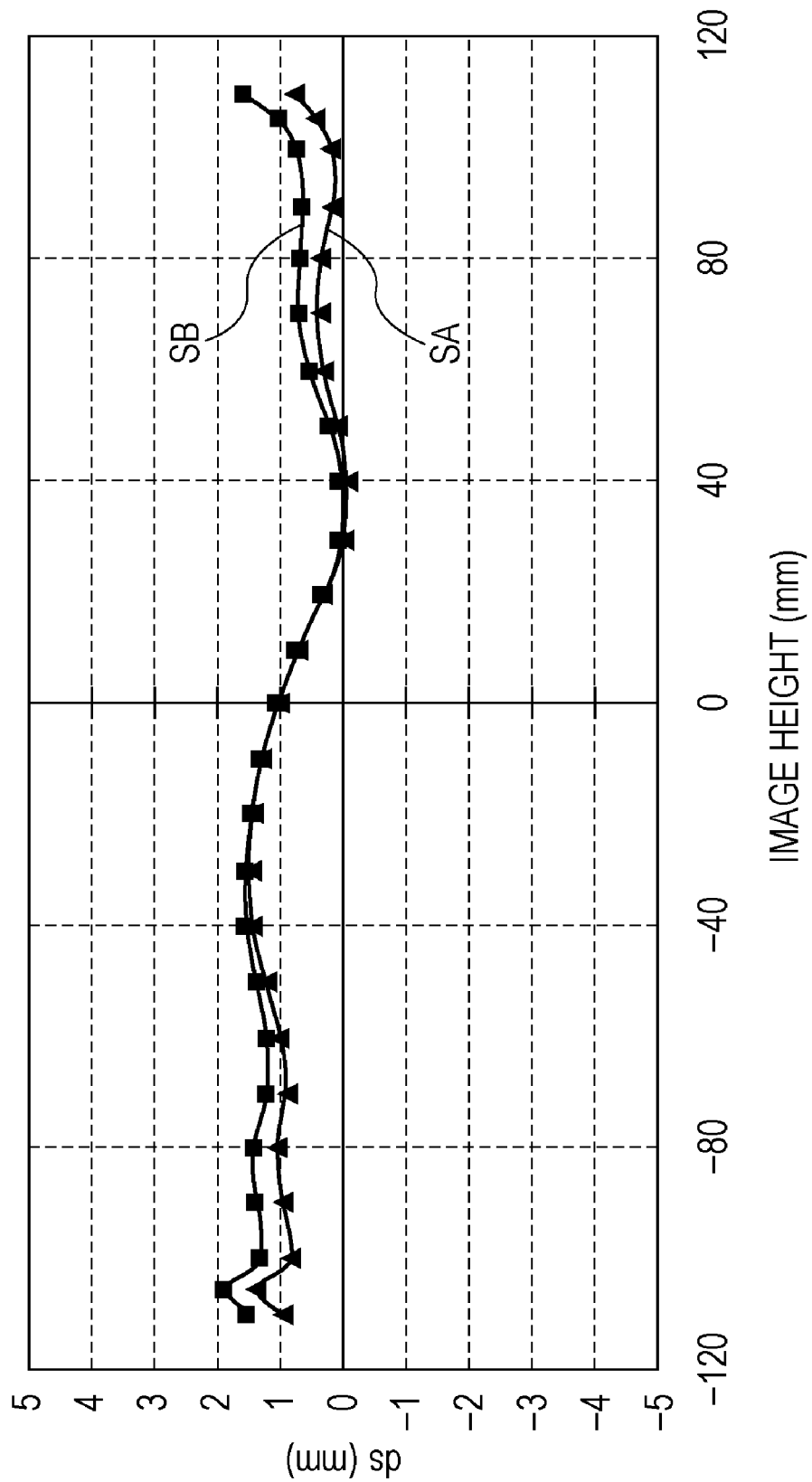

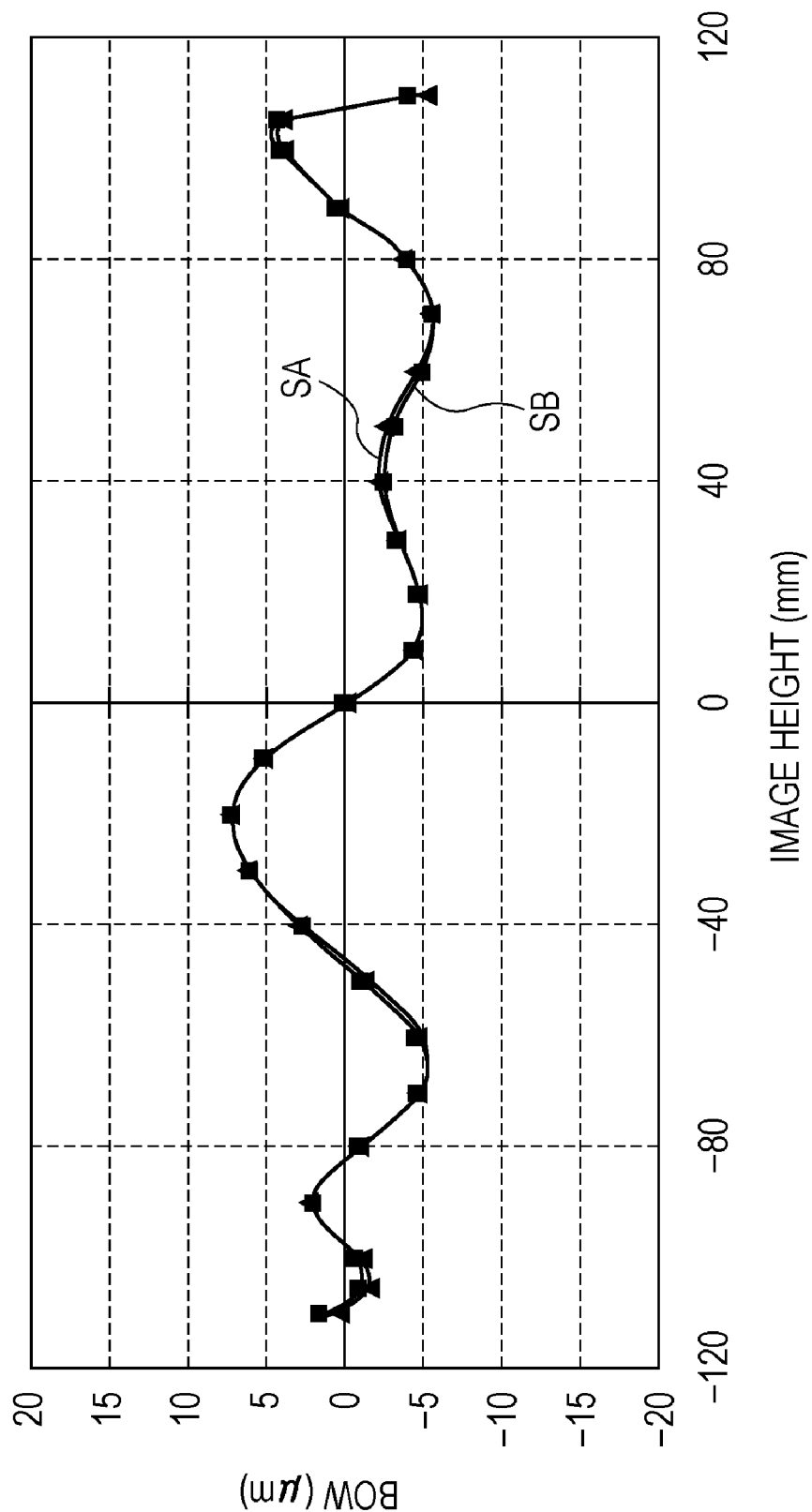

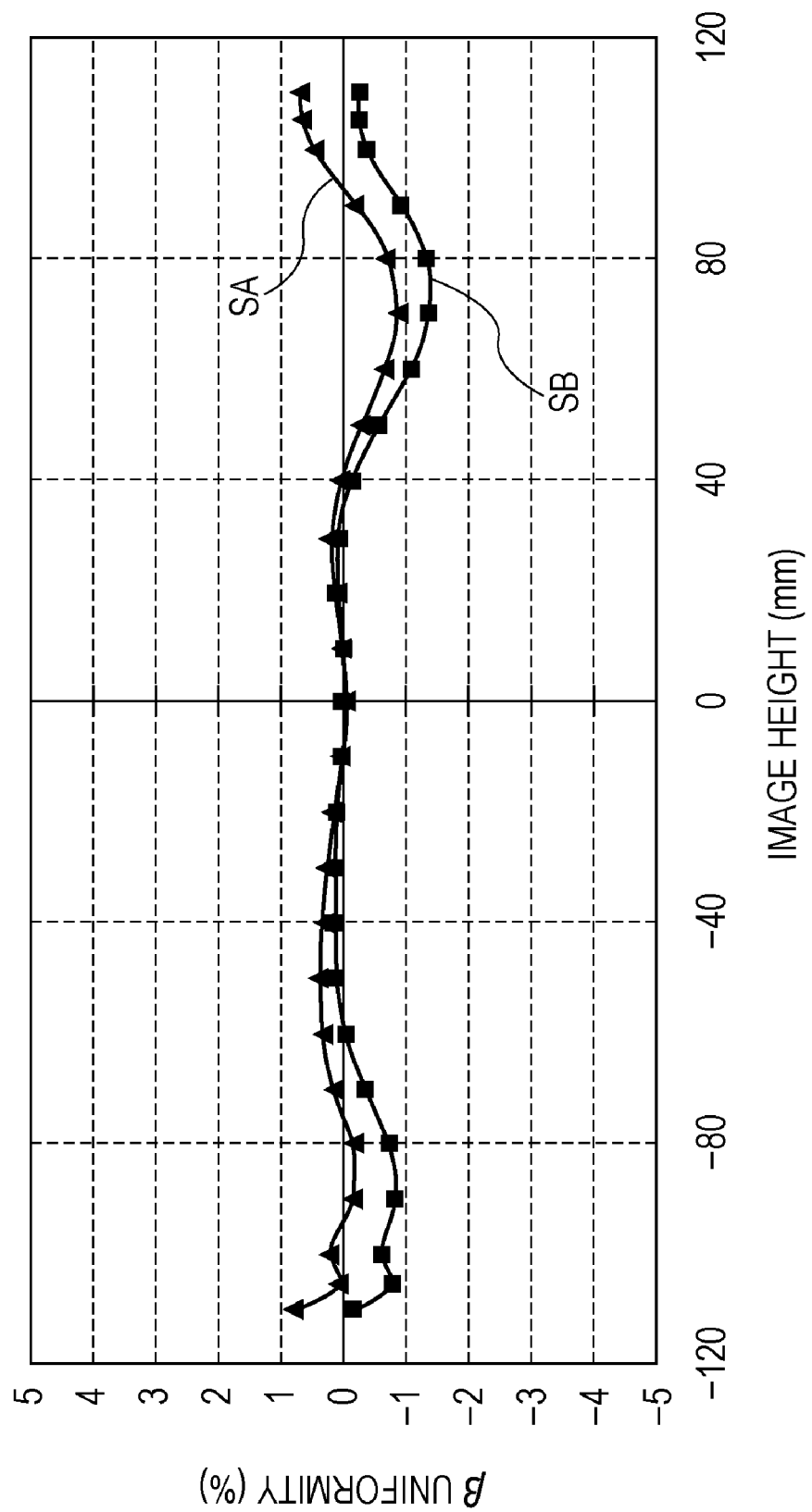

OPTICAL SCANNING APPARATUS

TECHNICAL FIELD

The present invention relates to an optical scanning apparatus and, in particular, to an optical scanning apparatus applied to a color image forming apparatus, such as a laser beam printer and a digital copier having an electrophotographic process.

BACKGROUND ART

A low-cost and compact optical scanning apparatus having the following configuration has been developed (refer to PTL 1). A plurality of light beams are made incident on different deflection surfaces of a light deflector at an angle in a sub-scanning cross section. Four photosensitive drums are arranged in parallel. For each of the two outer drums, the optical path is bent by a single mirror. For each of the two inner drums, the optical path is bent by two mirrors. In addition, a compact optical scanning apparatuses including a simplified optical unit using a prism as a beam splitting unit for removing restriction of the layout of the optical scanning apparatus has been developed (refer to PTL 2).

Citation List

Patent Literature
PTL 1: Japanese Patent Laid-Open No. 2008-76586
PTL 2: Japanese Patent Laid-Open No. 2001-350114

In the configuration described in PTL 1, a light beam traveling towards one of the inner photosensitive drums passes through a first scanning lens disposed between the light deflector and one of the mirrors and is reflected by the mirror. Thereafter, the light beam passes through a second scanning lens disposed between the two mirrors. In this structure, the first scanning lens is shared by the light beam traveling towards the inner photosensitive drum and the light beam traveling towards the outer photosensitive drum. Thus, the number of components is reduced and, therefore, the optical scanning apparatus is made compact in size.

However, when a light beam traveling towards the inner photosensitive drum is reflected by two mirrors and if an optical component is disposed so as to prevent interference between the optical component and the light beam, the height of the optical scanning apparatus is greater than the length of the optical path of a light beam traveling towards the outer photosensitive drum.

In order to bend the optical path by using two mirrors, the optical path of the light beam traveling towards the inner photosensitive drum requires more space in the height direction than that required by the light beam traveling towards the outer photosensitive drum regardless of the layout of the optical components (refer to FIGS. 9A and 9B).

In the structure described in PTL 2, a light beam is split into two optical paths traveling towards two photosensitive drums using a prism serving as the light beam splitting unit. However, the optical scanning apparatus is disposed at an angle with respect to a direction in which the photosensitive drums are arranged and, therefore, the angles of the light beams made incident on the respective drums are not the same. Accordingly, if this structure is applied to a color image forming apparatus including four photosensitive drums, it is difficult to make the entire apparatus compact in size.

Accordingly, the present invention provides an optical scanning apparatus capable of reducing the height thereof in the sub-scanning direction of the apparatus and a color image forming apparatus including the optical scanning apparatus.

SUMMARY OF INVENTION

The present invention discloses an optical scanning apparatus that includes a beam splitter disposed so as to straddle a plurality of optical paths between a deflection surface of a deflecting unit and the surfaces to be scanned each corresponding to one of a plurality of light source units. The beam splitter serves as a composite element including a transmissive surface that allows a light beam reaching a surface to be scanned located at a position physically the farthest from the deflection surface of the deflecting unit to pass therethrough and a plurality of reflective surfaces that reflect light beams reaching the surfaces to be scanned that are physically closer to the deflection surface of the deflecting unit than the surface to be scanned located at the position physically the farthest from the deflection surface of the deflecting unit. In a sub-scanning direction in a sub-scanning cross section, the transmissive surface is disposed between the reflective surfaces, and an optical path of the light beams reaching the surfaces to be scanned that are physically closer to the deflection surface of the deflecting unit than the surface to be scanned located at the position physically the farthest from the deflection surface of the deflecting unit between the reflective surfaces intersects with an optical path of the light beam reaching the surface to be scanned located at a position physically the farthest from the deflection surface of the deflecting unit between the deflection surface and the transmissive surface in the beam splitter.

Further features of the present invention will become apparent to persons of ordinary skill in the art from the following description of exemplary embodiments with reference to the attached drawings.

BRIEF DESCRIPTION OF DRAWINGS

FIG. 3B illustrates an optical characteristic of the imaging optical system according to the first embodiment of the present invention.

FIG. 3D illustrates an optical characteristic of the imaging optical system according to the first embodiment of the present invention.

FIG. 3E illustrates an optical characteristic of the imaging optical system according to the first embodiment of the present invention.

DESCRIPTION OF EMBODIMENTS

Embodiments of the present invention are described below with reference to the accompanying drawings.

First Embodiment

Figure 1A:
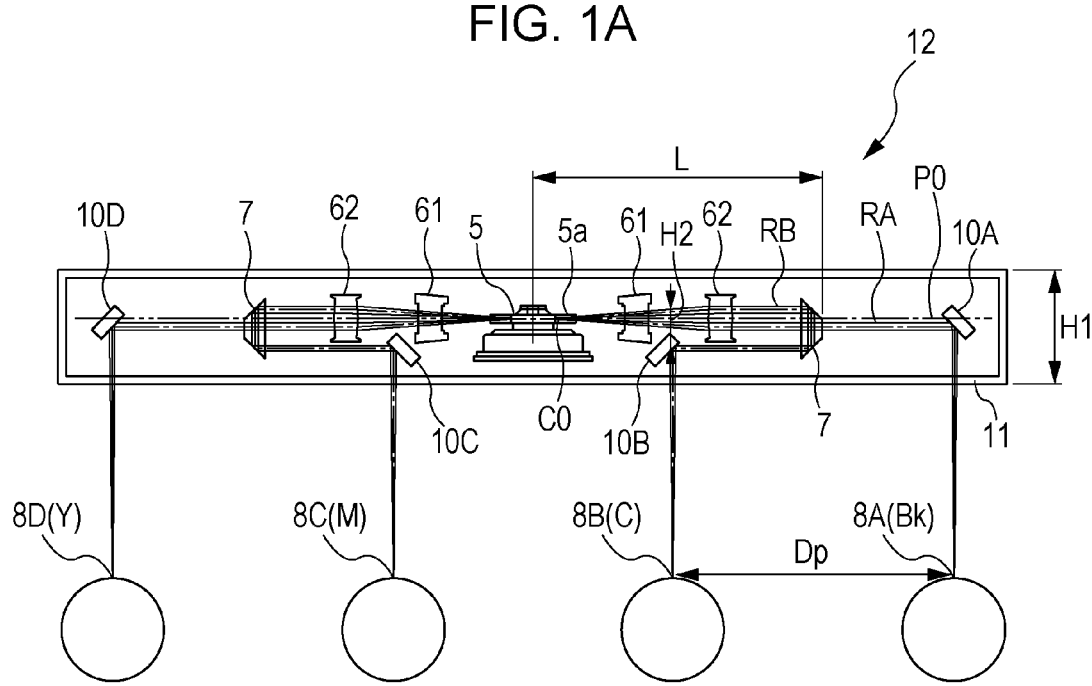
FIGS. 1A and 1B are a sub-scanning cross-sectional view of an optical scanning apparatus and an enlarged view of a main portion of the optical scanning apparatus according to a first embodiment of the present invention.
Figure 1B:
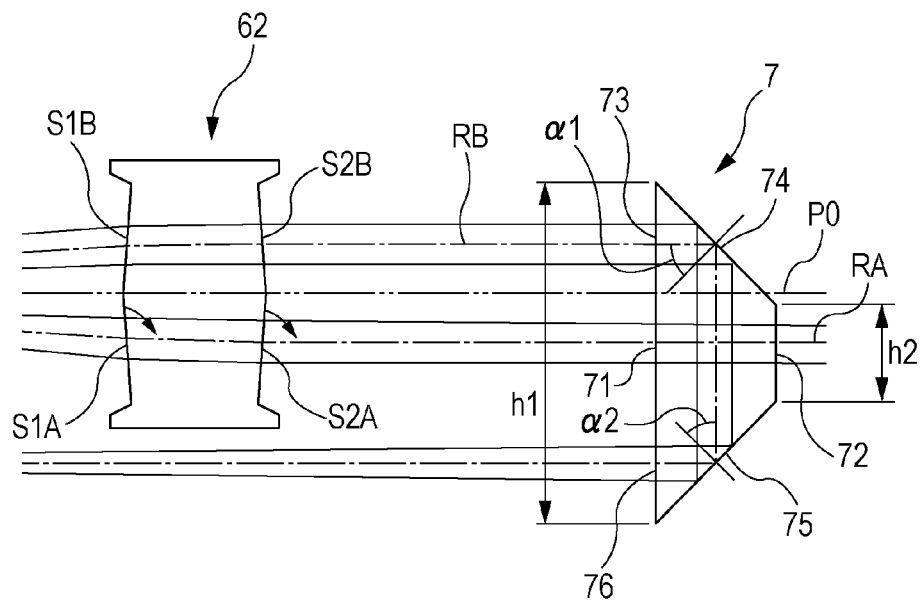

FIG. 1A is a sub-scanning cross-sectional view of an optical scanning apparatus according to a first embodiment of the present invention. FIG. 1B is an enlarged sub-scanning cross-sectional view of a beam splitter 7 formed as a composite device and the vicinity thereof. H1 (mm) is the height of the optical scanning apparatus in the sub-scanning direction (Z direction).

Figure 2A:
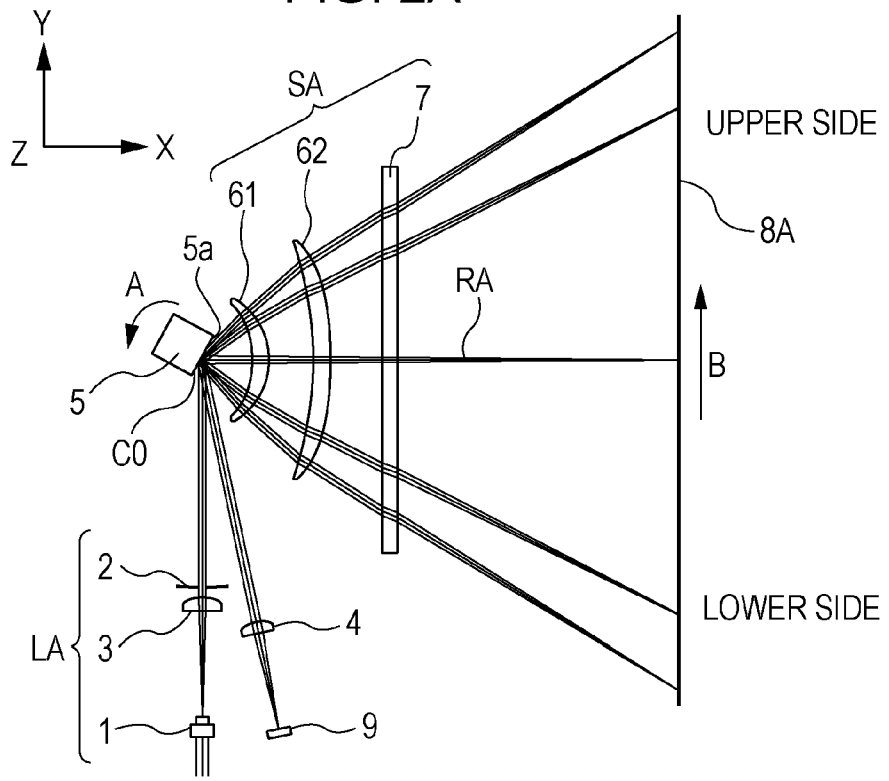
FIGS. 2A and 2B are expanded views of the optical scanning apparatus in a main scanning direction according to the first embodiment of the present invention.
Figure 2B:
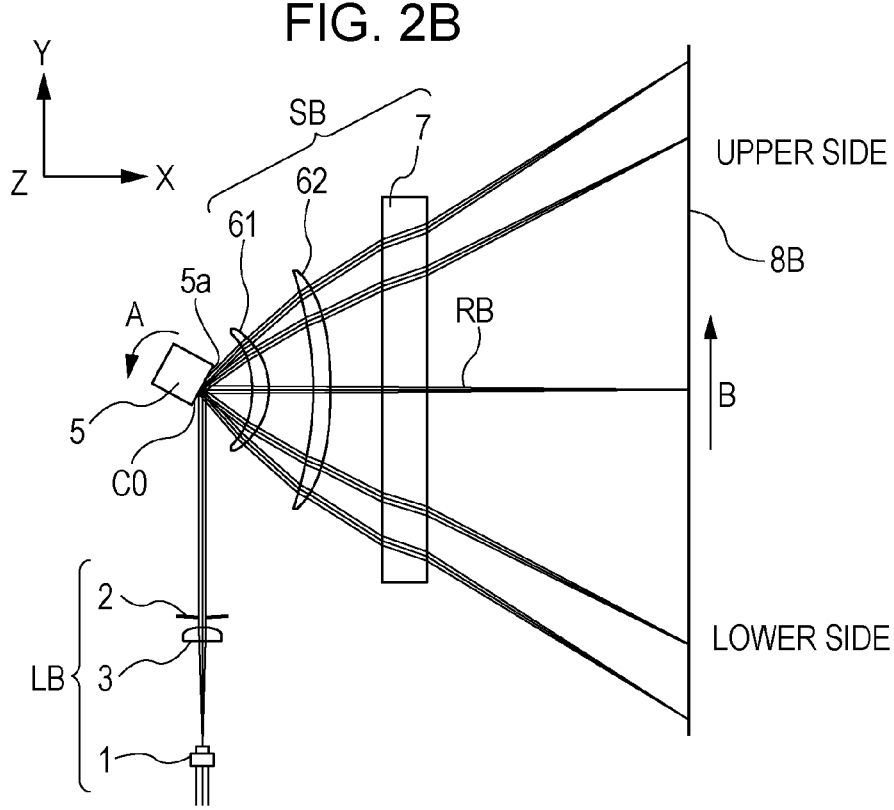

FIG. 2A is a main-scanning cross-sectional view of an imaging optical system SA through which a light beam RA traveling towards the surface of an outer photosensitive drum 8A passes. FIG. 2B is an expanded view of a main-scanning cross section of an imaging optical system SB through which a light beam RB traveling towards an inner photosensitive drum 8B passes.

As used herein, the term "optical axis of an imaging optical system" or "on-axis of an imaging optical system" refers to an axis that passes through the center of a surface to be scanned and that is perpendicular to the surface to be scanned. The term "sub-scanning direction (Z direction)" refers to a direction parallel to a rotation axis of the deflecting unit. The term "main scanning cross section" refers to a cross section for which a line normal thereto extends in the sub-scanning direction. The term "main scanning direction (Y direction)" refers to a direction in which a light beam deflected for scanning is projected onto the main scanning cross section. The term "sub-scanning cross section" refers to a cross section for which a line normal thereto extends in the main scanning direction.

In FIGS. 2A and 2B, light source unit 1 is shown. For example, the light source unit 1 is formed from a semiconductor laser. Also, an aperture stop 2 is shown. The aperture stop 2 shapes the light beam by limiting a light beam that passes therethrough. In addition, an anamorphic lens 3 is shown. The anamorphic lens 3 converts a divergent light beam emitted from the light source unit 1 into a weak convergent light beam in the main scanning cross section, and a line image is formed on a deflection surface 5a of a light deflector 5 in the sub-scanning section so as to have the long edge thereof in the main scanning direction. Note that the anamorphic lens 3 may include a collimator lens that converts a light beam into a weak convergent light beam in the main scanning cross section and a sub-scanning cross section and a cylindrical lens having a power in only the sub-scanning direction. In addition, the components such as the aperture stop 2 and the anamorphic lens 3 form an incident optical system (a condensing optical system) LA. The light deflector 5 serves as a light deflecting unit. The light deflector 5 includes a polygon mirror having four surfaces.

In addition, the imaging optical system SA is shown. The imaging optical system SA includes two image forming lenses (plastic lenses) 61 and 62 that serve as an imaging optical element having an fθ characteristic and the beam splitter 7.

The imaging optical system SA forms a spot image on the surface of the photosensitive drum 8A in the main scanning cross section from a single beam deflected for scanning by the light deflector 5 on the basis of image information. Furthermore, since the angles of tilt of the deflection surfaces of the polygon mirror in the sub-scanning direction differ, the imaging optical system SA corrects the plane tilt by making the deflection surface 5a of the light deflector 5 optically conjugate with the surface of the photosensitive drum 8A.

In addition, a synchronization detecting lens 4 for detecting synchronization is shown. The synchronization detecting lens 4 forms an image of a synchronization detecting light beam on a slit surface (not shown) disposed in the vicinity of a synchronization detecting sensor serving as a synchronization detecting element 9. According to the present embodiment, the timing of scanning start position for recording an image on the surface of the photosensitive drum 8A is controlled by using a synchronization signal obtained by detecting an output signal of the synchronization detecting element 9. Note the elements such as the synchronization detecting lens 4 and the synchronization detecting element 9 form an element of a synchronization position detecting optical system. The synchronization position detecting optical system may be provided for each of the four light beams corresponding to the four photosensitive drums.

According to the present embodiment, a light beam emitted from the light source unit 1 is made incident on the deflection surface 5a in a direction perpendicular to the optical axis of the imaging optical system in the main scanning cross section. In addition, in the sub-scanning cross section, the light beam is diagonally made incident at a predetermined angle of 3° with respect to the sub-scanning direction.

Subsequently, the light beam deflected for scanning by the deflection surface 5a of the light deflector 5 passes through the image forming lenses 61 and 62, and the optical path is split in the beam splitter 7 serving as a composite element. The split light beams reach the surfaces to be scanned. The light beam that has passed through the image forming lenses 61 and 62 form spot images on the surfaces of the photosensitive drums 8A and 8B. By rotating the light deflector 5 in the direction indicated by arrow A, the light beam is scanned over a surface to be scanned 8 in the main scanning direction indicated by arrow B at a constant speed.

In addition, the light beam RA traveling towards the surface of the photosensitive drum 8A that is physically the most distant from the light deflector 5 passes through a first transmissive surface 71 and a second transmissive surface 72 of the beam splitter 7. Thereafter, the optical path is bent by a mirror 10A, and the light beam RA reaches the surface of the photosensitive drum 8A. The light beam RB traveling towards the surface of the inner photosensitive drum 8B that is closer to the light deflector 5 than the surface of the photosensitive drum 8A, which is physically the most distant from the light deflector 5, passes through a third transmissive surface 73 of the beam splitter 7. Thereafter, the light beam RB is reflected by a first reflective surface 74 and a second reflective surface 75 and passes through a fourth transmissive surface 76. Subsequently, the light beam RB reaches the surface of the photosensitive drum 8A. At that time, by intersecting the light beams RA and RB in the beam splitter 7, the light beam RA can be separated from the light beam RB, and the traveling direction of the light beam RB can be reversed by 180°.

In addition, a metallic material, such as aluminum, may be vapor-deposited on the first reflective surface 74 and the second reflective surface 75. However, if, as in the present embodiment, the first reflective surface 74 and the second reflective surface 75 are formed as a total reflective surface using a plastic material, the cost can be advantageously reduced. As shown in FIG. 1B, an angle α1 formed by the light beam RB and the surface normal of the total reflective surface 74 in the sub-scanning direction is 44.94°. An angle α2 formed by the light beam RB and the surface normal of the total reflective surface 75 in the sub-scanning direction is 45.07°. Since the beam splitter 7 is formed of a plastic material having an index of refraction of 1.52781, a light beam is totally reflected if the incident angle relative to the reflective surface is greater than or equal to 40.88°.

Alternatively, the first transmissive surface, the third transmissive surface, and the fourth transmissive surface can be formed as independent mirror surfaces. However, as in the present embodiment, the first transmissive surface, the third transmissive surface, and the fourth transmissive surface can be formed as a single mirror surface (a flat surface). When the first transmissive surface, the third transmissive surface, and the fourth transmissive surface can be formed as a single mirror surface, the structure of a die can be simplified. Thus, the cost can be advantageously reduced. According to the present embodiment, a height h1 of the transmissive surface adjacent to the deflecting unit in the sub-scanning direction is 14 mm, and a height h2 of the transmissive surface adjacent to the surface to be scanned (the second transmissive surface) in the sub-scanning direction is 4 mm. In addition, the following conditional expression (1) is satisfied:

$$2.5 \times h2 < h1 < 4.5 \times h2 \quad (1)$$

If h1 is lower than or equal to the lower limit value, a problem of the light beam RA being too close to the light beam RB that has passed through the beam splitter occurs. If h1 is higher than or equal to the higher limit value, the size of the beam splitter is increased and, therefore, the height of the optical scanning apparatus cannot be reduced.

In addition, a distance L between the second transmissive surface 72 of the beam splitter and the rotation axis of the light deflector in a direction perpendicular to the rotation axis of the beam splitter is 67.98 mm. A distance Dp between a first image forming point in the surface of the photosensitive drum 8A on which the image of the light beam RA that reaches the surface to be scanned that is physically distant from the deflection surface of the light deflector is formed and a second image forming point in the surface of the inner photosensitive drum 8B on which the image of the light beam RB that reaches the surface to be scanned that is physically close to the deflection surface of the beam splitter in a direction perpendicular to the rotation axis of the deflecting unit is 69 mm. In addition, the following conditional expression (2) is satisfied:

$$0.9 \times Dp < L < 1.1 \times Dp \quad (2)$$

If L is out of this range, an area occupied by the optical path above the surface of the inner photosensitive drum (an area indicated by H2 in FIG. 1A) is increased. Therefore, it is difficult to reduce the thickness of the optical scanning apparatus. In addition, the optical length of the light beam RA needs to be significantly different from the optical length of the light beam RB.

The shape of a lens surface and the optical layout are shown in Tables 1 (A) and 1(B). Table 1 (A) is related to the incident optical system LA and the imaging optical system SA. Table 1(B) is related to an incident optical system LB and the imaging optical system SB.

TABLE 1(A)

| Design Data | | |
|---|---|---|
| Wavelength of Light Source | λ (nm) | 790 |
| Index of Refraction of Anamorphic Lens 3 | n3 | 1.52781 |
| Index of Refraction of Imaging Lens 61 | n61 | 1.52781 |
| Index of Refraction of Imaging Lens 62 | n62 | 1.52781 |
| Index of Refraction of Beam Splitter 7 | n7 | 1.52781 |
| Diameter of Aperture (Ellipse) | Y Direction (Main Scanning) | 2.317 |
|  | Z Direction (Sub-Scanning) | 2.867 |
| Oblique-Incidence Angle in Main Scanning Direction (Degree) |  | 90 |
| Oblique-Incidence Angle in Sub-Scanning Direction (Degree) |  | −3 |
| Maximum Angle of Emergence of Light Beam (Degree) |  | ±48.7 |
| Coordinates of Rotation Center of Polygon Mirror | X Direction | −5.761 |
|  | Y Direction | 4.238 |
| Number of Facets of Polygon Mirror |  | 4 |
| Diameter of Circumcircle of Polygon Mirror |  | φ20 |
| Effective Scan Width | W | 210 |
| fθ Coefficient | κ rad/mm) | 123.53 |
| Optical Layout | | |

|  | X Direction | Y Direction | Z Direction |
|---|---|---|---|
| Light Source 1 | 0.000 | −113.844 | 5.966 |
| Incident Surface of Anamorphic Lens 3 | 0.000 | −73.899 | 3.873 |
| Emergent Surface of Anamorphic Lens 3 | 0.000 | −70.903 | 3.716 |
| Aperture | 0.000 | −69.904 | 3.664 |
| Incident Surface of Imaging Lens 61 | 15.853 | −0.144 | 0.000 |
| Emergent Surface of Imaging Lens 61 | 21.523 | −0.144 | 0.000 |
| Incident Surface of Imaging Lens 62 | 35.482 | −0.144 | −2.050 |
| Emergent Surface of Imaging Lens 62 | 41.042 | −0.144 | −2.050 |
| Incident Surface of Beam Splitter 7 | 57.219 | −0.144 | 0.000 |
| Emergent Surface of Beam Splitter 7 | 62.219 | −0.144 | 0.000 |
| Surface to Be Scanned 8 | 152.057 | −0.144 | 0.000 |

TABLE 1(A)-continued

Design Data

Lens Shape Data

| | Anamorphic Lens 3 | | Imaging Lens 61 | | Imaging Lens 62 | | Beam Splitter 7 | |
|---|---|---|---|---|---|---|---|---|
| | Incident Surface | Emergent Surface | Incident Surface | Emergent Surface | Incident Surface | Emergent Surface | Incident Surface | Emergent Surface |
| | | | Main Scanning Direction | | | | | |
| R | ∞ | 3.72900E+01 | −3.56757E+01 | −2.14670E+01 | −8.95395E+01 | −2.02700E+02 | ∞ | ∞ |
| K | | | −3.93348E+00 | −7.35234E−01 | −3.65210E+01 | 1.97009E+01 | | |
| B4u | | | −1.77297E−05 | 3.15158E−06 | −1.93847E−06 | −4.22450E−06 | | |
| B6u | | | −1.81516E−08 | −3.50110E−08 | 3.86494E−10 | 2.29755E−09 | | |
| B8u | | | | | −6.29415E−14 | −1.55263E−12 | | |
| B10u | | | | | 5.26804E−17 | 3.47846E−16 | | |
| B4l | | | −1.77297E−05 | 3.15158E−06 | −1.93847E−06 | −4.22450E−06 | | |
| B6l | | | −1.76217E−08 | −3.52930E−08 | 4.73716E−10 | 2.49281E−09 | | |
| B8l | | | | | 3.12894E−13 | −1.62347E−12 | | |
| B10l | | | | | −1.05123E−16 | 4.91585E−16 | | |
| C5 | −5.2506E−03 | | | | | | | |
| | | | Sub-Scanning Direction | | | | | |
| r | ∞ | 1.89760E+01 | −4.70648E+01 | 6.30342E+02 | 1.58327E+02 | −1.51428E+01 | ∞ | ∞ |
| D2u | | | | | −1.93369E−05 | 1.09952E−05 | | |
| D4u | | | | | −2.13566E−08 | −2.91560E−08 | | |
| D6u | | | | | 1.31260E−10 | 5.02243E−11 | | |
| D8u | | | | | −1.40707E−13 | −2.32254E−14 | | |
| D10u | | | | | 4.23610E−17 | −1.31735E−18 | | |
| D2l | | | | | −1.93369E−05 | 1.09952E−05 | | |
| D4l | | | | | −7.21835E−08 | −7.30466E−08 | | |
| D6l | | | | | 1.77939E−10 | 1.19155E−10 | | |
| D8l | | | | | −1.71706E−13 | −9.27697E−14 | | |
| D10l | | | | | 5.81066E−17 | 2.58014E−17 | | |
| M0_1u | | | | | −8.28671E−02 | 3.42577E−02 | | |
| M2_1u | | | | | 1.19156E−05 | −2.72478E−05 | | |
| M4_1u | | | | | −4.17742E−08 | 5.92997E−09 | | |
| M6_1u | | | | | −3.47771E−11 | −5.13155E−11 | | |
| M8_1u | | | | | 2.38254E−14 | 3.01421E−14 | | |
| M10_1u | | | | | −9.74401E−18 | −1.56697E−17 | | |
| M0_1l | | | | | −8.28671E−02 | 3.42577E−02 | | |
| M2_1l | | | | | 9.97186E−06 | −1.92955E−05 | | |
| M4_1l | | | | | 1.24165E−08 | 1.20781E−08 | | |
| M6_1l | | | | | −3.52001E−11 | −1.52154E−11 | | |
| M8_1l | | | | | 8.77396E−15 | 2.25975E−15 | | |
| M10_1l | | | | | 1.43723E−18 | −2.27068E−18 | | |
| M0_4u | | | | | | 8.70963E−05 | | |
| M2_4u | | | | | | −3.22282E−07 | | |
| M4_4u | | | | | | 5.87256E−10 | | |
| M6_4u | | | | | | −3.10611E−13 | | |
| M0_4l | | | | | | 8.70963E−05 | | |
| M2_4l | | | | | | −3.22282E−07 | | |
| M4_4l | | | | | | 3.53894E−10 | | |
| M6_4l | | | | | | −1.16316E−13 | | |
| C3 | −5.6520E−03 | | | | | | | |

TABLE 1(B)

Design Data

| | | |
|---|---|---|
| Wavelength of Light Source | λ(nm) | 790 |
| Index of Refraction of Anamorphic Lens 3 | n3 | 1.52781 |
| Index of Refraction of Imaging Lens 61 | n61 | 1.52781 |
| Index of Refraction of Imaging Lens 62 | n62 | 1.52781 |
| Index of Refraction of Beam Splitter 7 | n7 | 1.52781 |
| Diameter of Aperture (Ellipse) | Y Direction (Main Scanning) | 2.303 |
| | Z Direction (Sub-Scanning) | 2.867 |
| Oblique-Incidence Angle in Main Scanning Direction (Degree) | | 90 |
| Oblique-Incidence Angle in Sub-Scanning Direction (Degree) | | 3 |
| Maximum Angle of Emergence of Light Beam (Degree) | | ±48.7 |
| Coordinates of Rotation Center of Polygon Mirror | X Direction | −5.761 |
| | Y Direction | 4.238 |
| Number of Facets of Polygon Mirror | | 4 |
| Diameter of Circumcircle of Polygon Mirror | | φ20 |
| Effective Scan Width | W | 210 |
| fθ Coefficient | κ rad/mm) | 123.53 |
| Optical Layout | | |

TABLE 1(B)-continued

Design Data

| | X Direction | Y Direction | Z Direction |
|---|---|---|---|
| Light Source 1 | 0.000 | −113.844 | −5.966 |
| Incident Surface of Anamorphic Lens 3 | 0.000 | −73.899 | −3.873 |
| Emergent Surface of Anamorphic Lens 3 | 0.000 | −70.903 | −3.716 |
| Aperture | 0.000 | −69.904 | −3.664 |
| Incident Surface of Imaging Lens 61 | 15.853 | −0.144 | 0.000 |
| Emergent Surface of Imaging Lens 61 | 21.523 | −0.144 | 0.000 |
| Incident Surface of Imaging Lens 62 | 35.482 | −0.144 | 2.050 |
| Emergent Surface of Imaging Lens 62 | 41.042 | −0.144 | −2.050 |
| Incident Surface of Beam Splitter 7 | 57.219 | −0.144 | 0.000 |
| Emergent Surface of Beam Splitter 7 | 71.219 | −0.144 | 0.000 |
| Surface to Be Scanned 8 | 155.152 | −0.144 | 0.000 |

Lens Shape Data

| | Anamorphic Lens 3 | | Imaging Lens 61 | | Imaging Lens 62 | | Beam Splitter 7 | |
|---|---|---|---|---|---|---|---|---|
| | Incident Surface | Emergent Surface | Incident Surface | Emergent Surface | Incident Surface | Emergent Surface | Incident Surface | Emergent Surface |
| Main Scanning Direction | | | | | | | | |
| R | ∞ | 3.68200E+01 | −3.56757E+01 | −2.14670E+01 | −8.95395E+01 | −2.02700E+02 | ∞ | ∞ |
| K | | | −3.93348E+00 | −7.35234E−01 | −3.65210E+01 | 1.97009E+01 | | |
| B4u | | | −1.77297E−05 | 3.15158E−06 | −1.93847E−06 | −4.22450E−06 | | |
| B6u | | | −1.81516E−08 | −3.50110E−08 | 3.86494E−10 | 2.29755E−09 | | |
| B8u | | | | | −6.29415E−14 | −1.55263E−12 | | |
| B10u | | | | | 5.26804E−17 | 3.47846E−16 | | |
| B4l | | | −1.77297E−05 | 3.15158E−06 | −1.93847E−06 | −4.22450E−06 | | |
| B6l | | | −1.76217E−08 | −3.52930E−08 | 4.73716E−10 | 2.49281E−09 | | |
| B8l | | | | | 3.12894E−13 | −1.62347E−12 | | |
| B10l | | | | | −1.05123E−16 | 4.91585E−16 | | |
| C5 | −5.2506E−03 | | | | | | | |
| Sub-Scanning Direction | | | | | | | | |
| r | ∞ | 1.89760E+01 | −4.70648E+01 | 6.30342E+02 | 1.58327E+02 | −1.51428E+01 | ∞ | ∞ |
| D2u | | | | | −1.93369E−05 | 1.09952E−05 | | |
| D4u | | | | | −2.13566E−08 | −2.91560E−08 | | |
| D6u | | | | | 1.31260E−10 | 5.02243E−11 | | |
| D8u | | | | | −1.40707E−13 | −2.32254E−14 | | |
| D10u | | | | | 4.23610E−17 | −1.31735E−18 | | |
| D2l | | | | | −193369E−05 | 1.09952E−05 | | |
| D4l | | | | | −7.21835E−08 | −7.30466E−08 | | |
| D6l | | | | | 1.77939E−10 | 1.19155E−10 | | |
| D8l | | | | | −1.71706E−13 | −9.27697E−14 | | |
| D10l | | | | | 5.81066E−17 | 2.58014E−17 | | |
| M0_1u | | | | | 8.28671E−02 | −3.42577E−02 | | |
| M2_1u | | | | | −1.19156E−05 | 2.72478E−05 | | |
| M4_1u | | | | | 4.17742E−08 | −5.92997E−09 | | |
| M6_1u | | | | | 3.47771E−11 | 5.13155E−11 | | |
| M8_1u | | | | | −2.38254E−14 | −3.01421E−14 | | |
| M10_1u | | | | | 9.74401E−18 | 1.56697E−17 | | |
| M0_1l | | | | | 8.28671E−02 | −3.42577E−02 | | |
| M2_1l | | | | | −9.97186E−06 | 1.92955E−05 | | |
| M4_1l | | | | | −1.24165E−08 | −1.20781E−08 | | |
| M6_1l | | | | | 3.52001E−11 | 1.52154E−11 | | |
| M8_1l | | | | | −8.77396E−15 | −2.25975E−15 | | |
| M10_1l | | | | | −1.43723E−18 | 2.27068E−18 | | |
| M0_4u | | | | | | 8.70963E−05 | | |
| M2_4u | | | | | | −3.22282E−07 | | |
| M4_4u | | | | | | 5.87256E−10 | | |
| M6_4u | | | | | | −3.10611E−13 | | |
| M0_4l | | | | | | 8.70963E−05 | | |
| M2_4l | | | | | | −3.22282E−07 | | |
| M4_4l | | | | | | 3.53894E−10 | | |
| M6_4l | | | | | | −1.16316E−13 | | |
| C3 | −5.6520E−03 | | | | | | | |

The origin of the coordinates of the lens layout shown in Tables 1(A) and 1(B) is denoted by the reference symbol C0 shown in FIGS. 1 and 2. C0 indicates a deflection reflection point (a reference point) of a chief ray of the light beam that scans the center of the image.

Let P0 denote a plane that is perpendicular to the deflection surface of the light deflector 5 and that passes through the reference point C0. Then, the light beams RA and RB are deflected for scanning at angles of −3° and +3° with respect to the plane P0, respectively. That is, the incident optical systems LA and LB that make light incident on the light deflector 5 are disposed so as to be at angles of −3° and +3° with respect to the plane P0 in the sub-scanning direction. If the angle is too large, it is difficult to correct deformation of a spot caused by twisting of wavefront aberration. However, if the angle is too small, it is difficult to split the light beam. It is desirable that the angle be set to a value in the range from 2° to 5°.

According to the present embodiment, the anamorphic lens 3 has an incident surface formed as a diffraction surface having diffraction gratings on a flat plane and an emergent surface formed as an anamorphic refraction surface having different radiuses of curvature in the main scanning direction and the sub-scanning direction. The anamorphic lens 3 is formed of a plastic material by injection molding. The anamorphic lens 3 serves as a temperature compensation optical system that compensates for a change in refractive power caused by variations in the environment by using a change in diffractive power caused by a change in the wavelength of a semiconductor laser.

The diffraction surface is defined using the following phase function:

$$\phi = 2\pi m/\lambda (C_3 Z^2 + C_5 Y^2)$$

where $\phi$ represents a phase function, m represents the diffraction order (first-order refracted light is used in the present embodiment (m=1)), and $\lambda$ represents the design wavelength ($\lambda$=790 nm in the present embodiment).

In addition, according to the present embodiment, each of the incident surfaces and emergent surfaces of the image forming lenses 61 and 62 in the meridional direction is an aspherical surface with a shape that can be expressed as a function up to a 10th-order function. The lens surfaces of the image forming lenses 61 and 62 are defined using the following aspherical surface formula expressed using the optical layouts shown in Tables 1(A) and 1(B) as origins, respectively. For example, for a lens incident surface of the image forming lens 61, the origin of the aspherical surface formula is defined as: (X, Y, Z)=(15.853, −0.144, 0.000). Let an X-axis that passes through the origin indicate the optical axis direction, and let an axis that is perpendicular to the optical axis in the main scanning cross section be Y-axis that passes through the origin. Then, the shape of the lens surface in the meridional direction corresponding to the main scanning direction is expressed as follows:

$$X = \frac{Y^2/R}{1 + (1-(1+K)(Y/R)^2)^{1/2}} + B_4 Y^4 + B_6 Y^6 + B_8 Y^8 + B_{10} Y^{10} \quad \text{[Math. 1]}$$

where R represents the radius of curvature in the meridional direction, and K, $B_4$, $B_6$, $B_8$, and $B_{10}$ represent aspherical coefficients. In addition, the shape of the lens surface in the sagittal direction is expressed as follows:

$$S = \frac{Z^2/r'}{1+(1-(Z/r')^2)^{1/2}} + \sum\sum M_{j-k} Y^j Z^k \quad \text{[Math. 2]}$$

In this equation, S represents the shape in the sagittal direction defined in a plane that includes a normal line of the meridional line at respective positions and that is perpendicular to the main scanning cross section. The radius of curvature r' in the sub-scanning direction at a position distant from the optical axis by Y in the main scanning direction (a radius of curvature r' in the sagittal direction) is expressed as follows:

$$1/r' = 1/r + D_2 Y^2 + D_4 Y^4 + D_6 Y^6 + D_8 Y^8 + D_{10} Y^{10} + D_{12} Y^{12} \quad \text{[Math. 3]}$$

where r represents a radius of curvature in the sagittal direction on the optical axis, and $D_2$, $D_4$, $D_6$, $D_8$, $D_{10}$, and $D_{12}$, represent sagittal change coefficients.

In addition, Mj_k represents a coefficient indicating an aspherical surface in the sagittal direction. For example, Mj__1 represents the first-order term of Z and also represents the tilt of the surface in the sub-scanning direction (a tilt in the sagittal direction). Mj__4 represents the fourth-order term of Z and also represents an aspherical surface in the sub-scanning direction. In the present embodiment, the tilt amount in the sagittal direction is changed along the main scanning direction by using the zeroth-order, second-order, fourth-order, sixth-order, eighth-order, and tenth-order coefficients. In addition, the aspherical surface amount in the sagittal direction is changed along the main scanning direction by using the zeroth-order, second-order, fourth-order, and sixth-order coefficients. Furthermore, each of the coefficients shown in Tables 1A and 1B is followed by one of suffixes u and l, which represent an "upper side" and a "lower side", respectively. A side on which the light source unit 1 is disposed is defined as a "lower side", and a side opposite to the side on which the light source unit 1 is disposed is defined as an "upper side". The coefficients having no suffix U and l represent coefficients common to the upper side and lower side.

In the present embodiment, as shown in Tables 1A and 1B, the image forming lens 61 is shared by the imaging optical systems SA and SB. In addition, as shown in FIG. 1B, the incident surface of the image forming lens 62 is a multi-stage toric surface formed by overlapping the following two toric surfaces with each other: a toric surface S1A having surface vertices (35.482, −0.144, −2.050) and a toric surface S1B having surface vertices (35.482, −0.144, 2.050). Similarly, the emergent surface of the image forming lens 62 is formed from a multi-stage toric surface S2B.

According to the present embodiment, an infrared light source having an oscillation wavelength of a light beam $\lambda$=790 nm is used as the light source unit 1. In addition, a proportionality coefficient $\kappa$ between the image height Y and a deflection reflection angle $\theta$ (Y=$\kappa\theta$) is 123.53 (rad/mm).

Figure 3A:
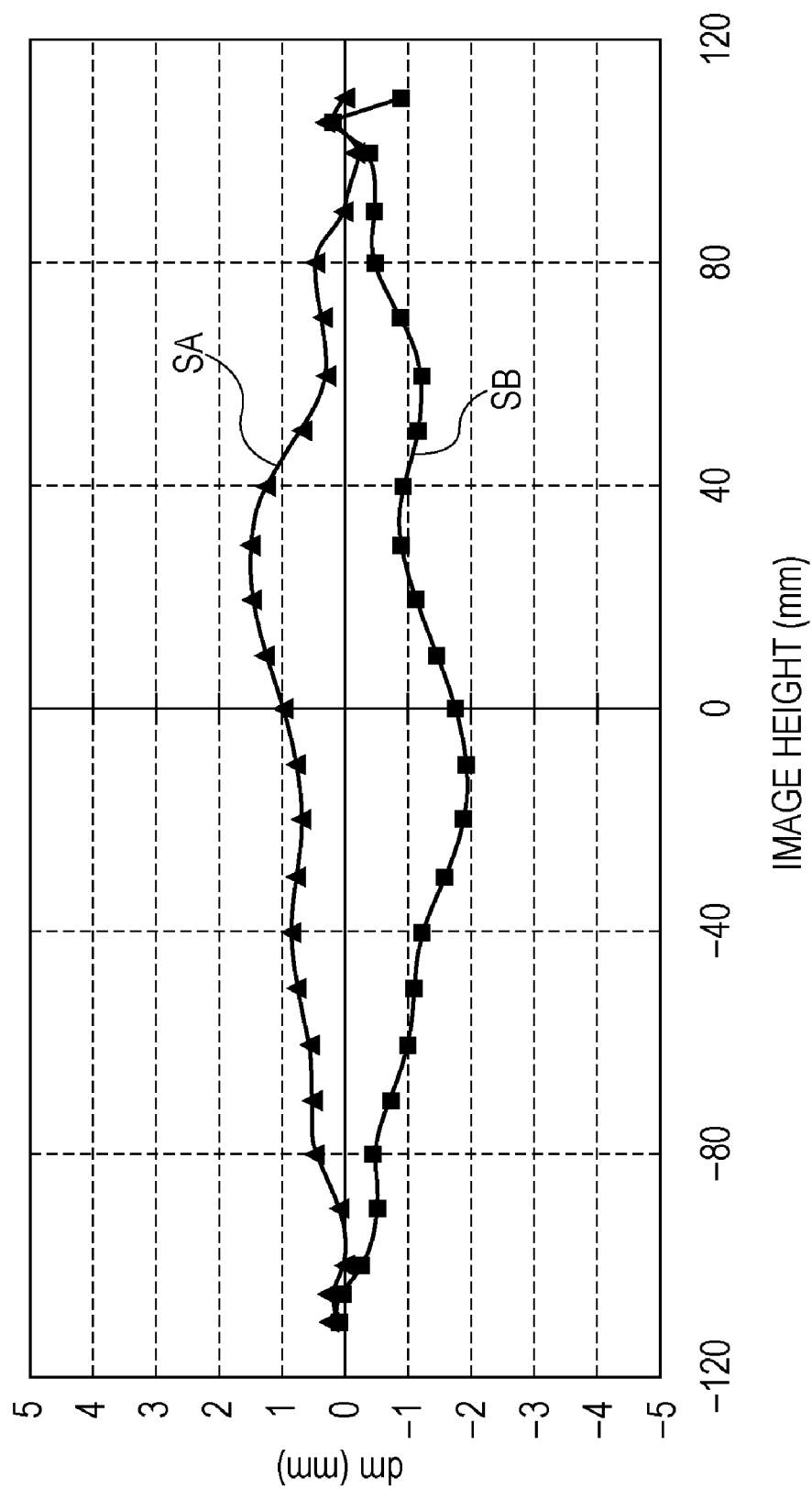
FIG. 3A illustrates an optical characteristic of an imaging optical system according to the first embodiment of the present invention.

FIG. 3A is a graph illustrating field curvature dm in the main scanning direction according to the first embodiment of the present invention. FIG. 3B is a graph illustrating field curvature ds in the sub-scanning direction. The graphs are overwritten on the imaging optical system SA which the light beam RA traveling towards the surface of the outer photosensitive drum 8A passes through and the imaging optical system SB which the light beam RB traveling towards the outer photosensitive drum 8B passes through. In an effective scanning width of the effective image area (W=210 mm), the field curvature in the main scanning direction is 1.66 mm for SA and is 2.10 mm for SB. The field curvature in the sub-scanning direction is 1.55 mm for SA and is 1.91 mm for SB.

For the imaging optical systems SA and SB, the shapes of the image forming lenses 61 and 62 are the same. However, a distance along which a light beam passes through the beam splitter 7 of the imaging optical system SA is 5 mm, and a distance along which a light beam passes through the beam splitter 7 of the imaging optical system SB is 14 mm. Since the distances differ from each other, the shapes of field curvature differ. Accordingly, in order to make the field curvatures the same at the peripheral image height at which a focal depth width is smaller than that at the central image height in the main scanning direction, different main scanning shapes of the anamorphic lens 3 are employed. In this way, for the main scanning cross section of the beam made incident on the deflection surface 5a, a weak divergent light beam is made incident on the deflection surface 5a in the incident optical system LA, and a weak convergent light beam is made incident on the deflection surface 5a in the incident optical system LB.

In addition, by employing the beam splitter 7 having the transmissive surfaces 72 and 76 with different shapes in the main scanning direction, the shapes of field curvature can be made the same even if the incident optical system LA is completely the same as the incident optical system LB. However, if the field curvature has a highly asymmetry property in the main scanning direction, the shape of the beam splitter 7 in the main scanning direction needs to have an asymmetry property in the main scanning direction. In such a case, beam splitters having the same configuration cannot be disposed on either side of the light deflector 5. However, if, as in the present embodiment, the asymmetry property of field curvature is not so significant, beam splitters having the same configuration can be disposed on either side of the light deflector 5 by designing the main scanning shape of the beam splitter 7 so that the main scanning shape is symmetrical.

Figure 3C:
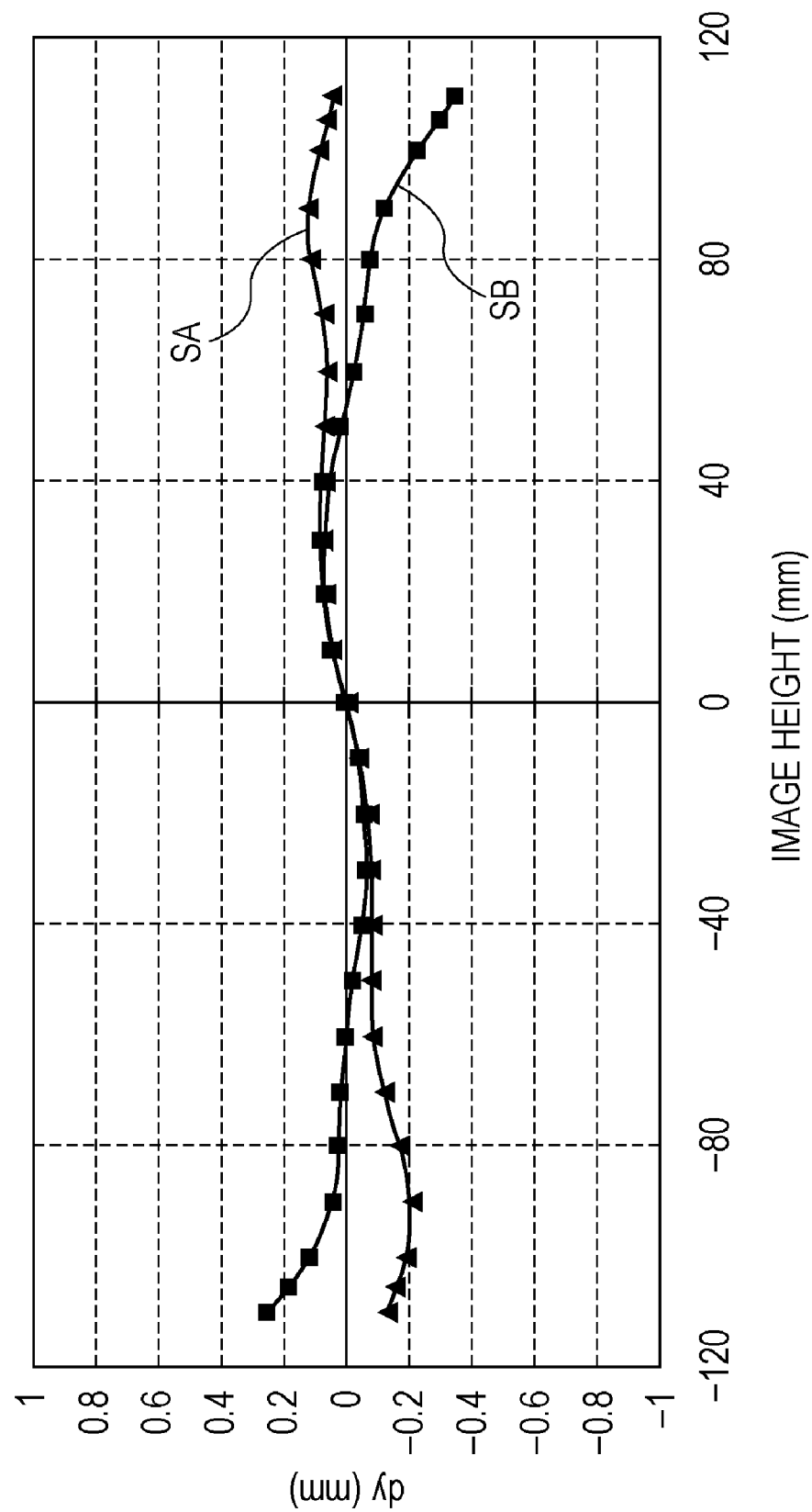
FIG. 3C illustrates an optical characteristic of the imaging optical system according to the first embodiment of the present invention.

FIG. 3C is a graph illustrating an fθcharacteristic according to the first embodiment of the present invention. In FIG. 3C, a difference obtained by subtracting the ideal image height from the position which the light beam actually reaches is shown. In the imaging optical system SA, the maximum offset is 0.212 mm. In the imaging optical system SB, the maximum offset is 0.299 mm. These offsets are too large if these values are directly used. However, by changing an image clock in accordance with each of the image heights, the fθ characteristic can be reduced. Note that if the offset of the fθ characteristic is too large, the diameter of the spot in the main scanning direction is changed. According to the present embodiment, an fθ characteristic that does not affect the diameter of a spot that has an impact on the depth of a latent image can be obtained.

FIG. 3D is a graph illustrating the bent of a scanning line according to the first embodiment of the present invention. In the imaging optical system SA, the offset is 12.6 μm. In the imaging optical system SB, the offset is 12.7 μm. Thus, the offset is corrected to a level at which the optical scanning apparatus can be used for color image forming apparatuses without any problems.

FIG. 3E is a graph illustrating the uniformity of an imaging magnification factor in the sub-scanning direction according to the first embodiment of the present invention. In the imaging optical system SA, the maximum factor is 0.84%. In the imaging optical system SB, the maximum factor is 1.34%. Thus, the imaging magnification factor is corrected to a level at which a multi-beam light source that emits a plurality of light beams can be used without any problems. In addition, on the optical axes of the imaging optical systems SA and SB, the imaging magnification factors βa and βb in the sub-scanning direction are −2.56 and −2.56, respectively.

Figure 4A:
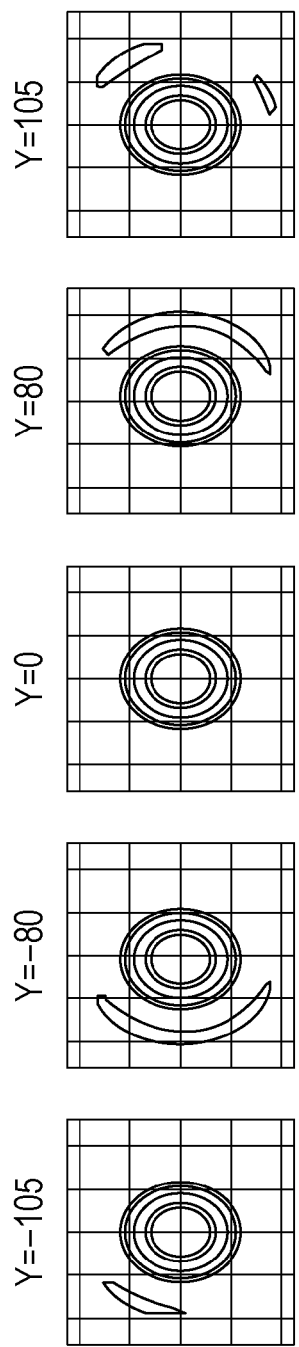
FIGS. 4A and 4B illustrate spot profiles of the imaging optical system according to the first embodiment of the present invention.
Figure 4B:
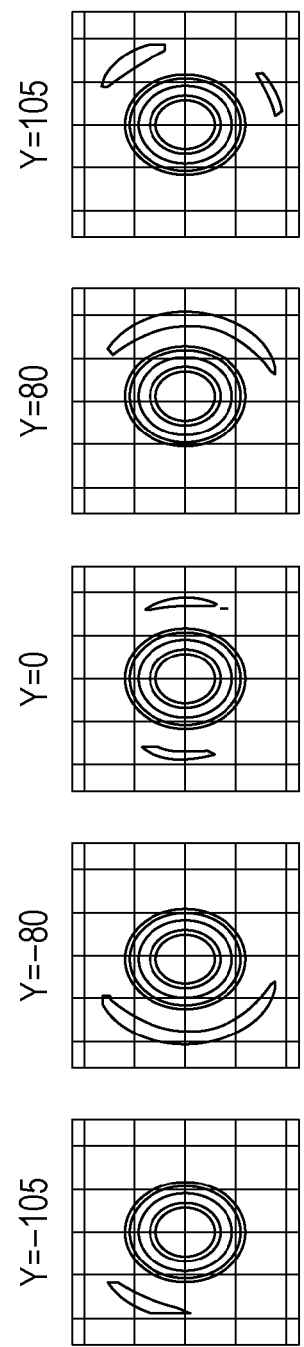

FIGS. 4A and 4B illustrate cross-sectional shapes of spots at the image heights in the imaging optical systems SA and SB. In FIGS. 4A and 4B, cross sections obtained by cutting the spot into slices having 2%, 5%, 10%, 13.5%, 36.8%, and 50% of the peak light intensity are shown for each of the image heights.

In general, in optical scanning apparatuses that emit a light beam onto the deflection surface of the light deflector at an angle in the sub-scanning cross section, a spot is rotated due to twisting of the wavefront aberration. According to the present embodiment, by optimizing the power arrangement of the surfaces and one of a tilt amount and a shift amount of the image forming lens, the twisting of the wavefront aberration can be reduced. In particular, by changing the tilt angle of the incident surface and emergent surface of the image forming lens 62 in the sub-scanning direction (a tilt amount in the sagittal direction) along the main scanning direction, the spot rotation due to twisting of the wavefront aberration and a scanning line curvature described below can be excellently corrected at the same time.

Figure 10A:
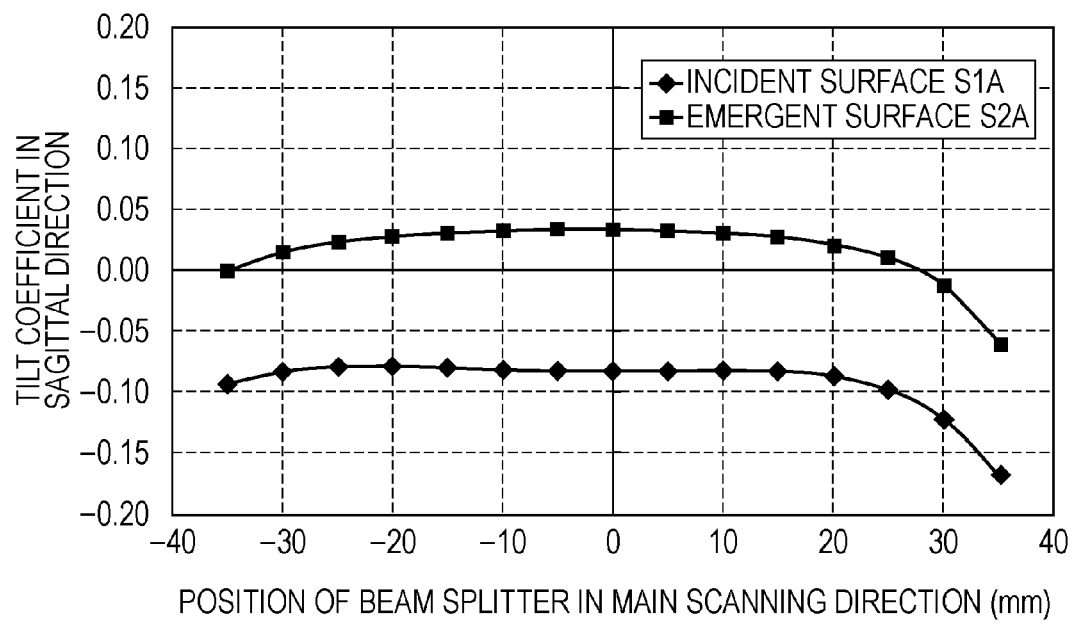
FIGS. 10A and 10B are diagrams illustrating a tilt coefficient in the sagittal direction.

That is, as shown in FIG. 10A, the incident surface S1A and the emergent surface S2A of the image forming lens 62 for the light beam RA have a changed tilt coefficient in the sagittal direction (the first-order term of Z shown in [Math. 2]). As indicated by the graph, the tilt coefficient of the incident surface S1A in the sagittal direction on the optical axis is −0.0829, and the tilt coefficient of the emergent surface S2A in the sagittal direction on the optical axis is 0.0343. These values correspond to the tilt angles of −4.74° and 1.96°. As shown in FIG. 1B, as a relationship between the tilt direction and the sign of the coefficient, the coefficient indicates a positive direction when the surface is tilted towards a direction indicated by the arrow.

Although a change in the tilt coefficient in the sagittal direction is small in the vicinity of the optical axis at the surfaces S1A and S2A, the tilt coefficient in the sagittal direction is designed to gradually change to a negative value from a position remote from the optical axis by 20 mm in the main scanning direction. Spot rotation due to twisting of the wavefront aberration and scan line curvature are increased in an area in which the scanning angle of view is large. The optical performance can be excellently corrected by changing the tilt coefficient of each of the two surfaces in the sagittal direction. Since the tilt in the sagittal direction for the light beam RB is similar to that for the light beam RA, the description thereof is not repeated.

The effect of an optical scanning apparatus including the beam splitter 7 serving as a composite element on reduction in the height of the optical scanning apparatus, which is a first feature of the present invention, is described next.

Figure 9A:
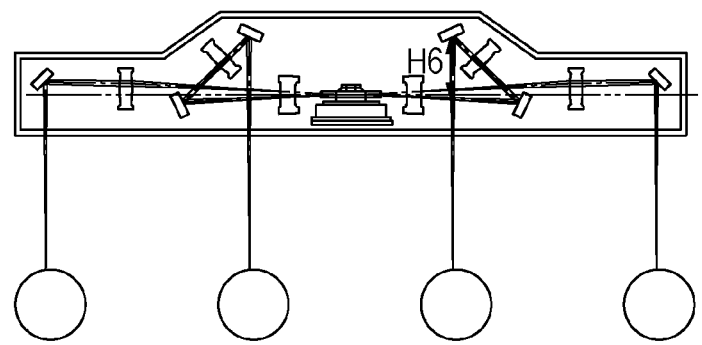
FIGS. 9A and 9B are sub-scanning cross-sectional views of existing optical scanning apparatuses.
Figure 9B:
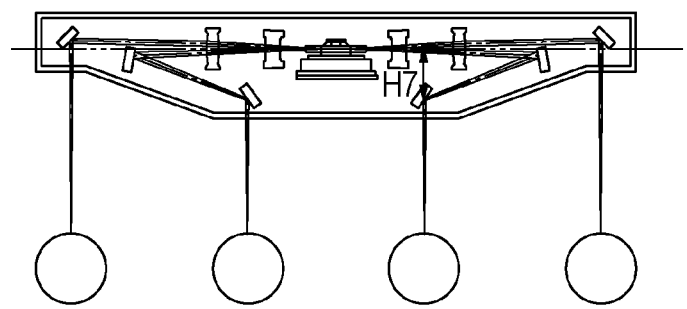

In order to reduce a height H of an optical scanning apparatus, all of the light beams need to be converged in the sub-scanning direction above the inner photosensitive drum 8B. However, in existing optical scanning apparatuses in which the direction of the optical path is reversed by two mirrors, the light beam returned by the mirror is reflected at an angle with respect to the sub-scanning direction, as shown in FIGS. 9A and 9B. Thus, the area occupied by the optical axis above the photosensitive drum 8B is large (H6=21.2 mm, H7=19.4 mm).

To solve this problem, the number of turns can be set to three, and the optical axis is turned to a direction substantially opposite to a direction in which the light beam travels towards the reflective member (H2=9.2 mm in the first embodiment).

$$H2 \ll H7 < H6 \qquad (3)$$

In addition, in order to reduce the height of the optical scanning apparatus, the optical axis can be effectively turned towards a driving unit for driving the deflection surface. In general, a polygon mirror requires a motor (a driving unit) for rotationally driving the polygon mirror. Since the motor has a thickness in the height direction, the deflection reflection point is disposed on the opposite side of the middle point of the thickness of a housing 11 of the optical scanning apparatus from the motor so that the light beam is turned to a free space formed on the side of the driving unit. Thus, the space is more effectively used. Such a configuration according to the first embodiment allows a small housing thickness of 27 mm that was not previously possible.

The effect of reduction in the sensitivity to an irradiation position using the beam splitter 7, which is a second feature of the present invention, is described next. As used herein, the term "irradiation position" refers to a position on the photosensitive drum at which a light beam forms an image in the sub-scanning direction.

Figure 5A:
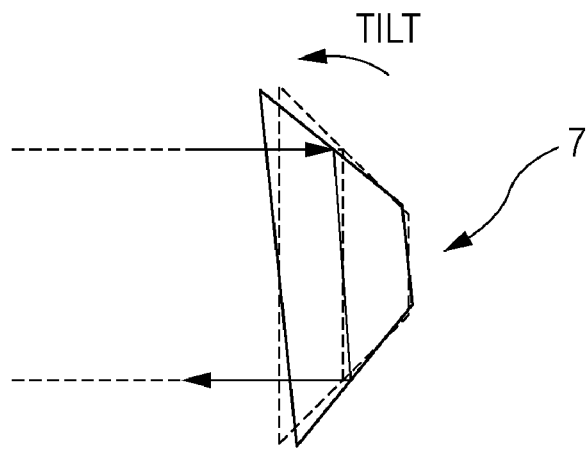
FIGS. 5A to 5C illustrate the sensitivity of a beam splitter with respect to a layout according to the first embodiment of the present invention.
Figure 5B:
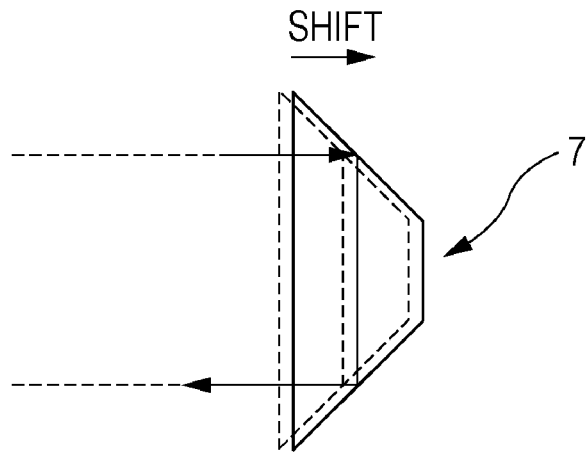
Figure 5C:
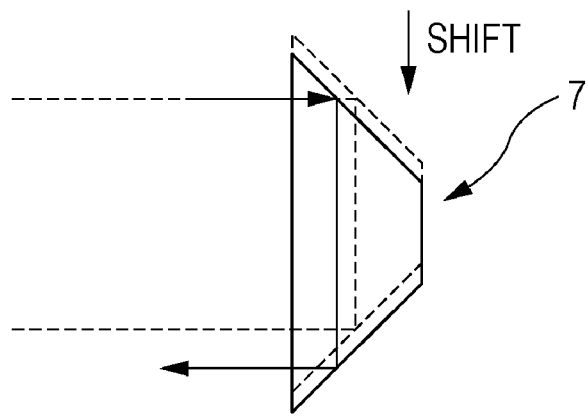

FIGS. 5A, 5B, and 5C are schematic illustrations of the beam splitter 7 displaced in the sub-scanning direction. FIG. 5A illustrates the beam splitter 7 tilted in the sub-scanning direction. FIG. 5B illustrates the beam splitter 7 shifted in a direction in which the light beam travels. FIG. 5C illustrates the beam splitter 7 the beam splitter 7 shifted in a direction perpendicular to the direction in which the light beam travels.

As shown in FIG. 5A, if an angle formed by the planar reflective surfaces 74 and 75 is a right angle, the angle of the emerging light beam remains unchanged even when the beam splitter 7 is tilted in the sub-scanning direction. Accordingly, the optical scanning apparatus including the beam splitter 7 is configured so that a variation in the irradiation position is very small when tilt eccentricity occurs. However, as shown in FIG. 5C, when the beam splitter 7 is shifted in a direction perpendicular to the direction in which the light beam travels, a variation in the irradiation position twice the size of the shift amount occurs since the first reflective surface 74 and the second reflective surface 75 are integrated with each other.

This problem is described below in Section "Description of Comparative Example" with reference to a comparative example.

In addition, when, as shown in FIG. 5B, the beam splitter 7 is shifted in a direction in which the light beam travels, the irradiation position remains unchanged. The image forming position in the main scanning direction (i.e., the fθ characteristic) is changed by a constant ratio.

Description of Comparative Example

Figure 6A:
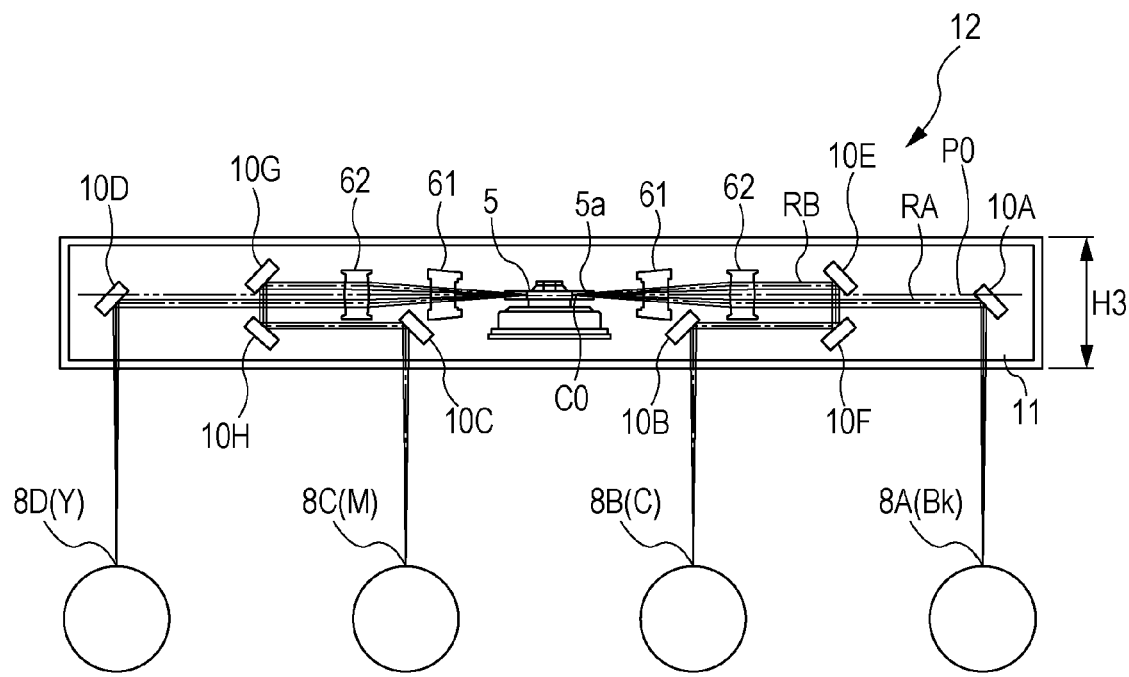
FIGS. 6A and 6B are a sub-scanning cross-sectional view of an optical scanning apparatus of a comparative example and an enlarged view of a main portion of the optical scanning apparatus.
Figure 6B:
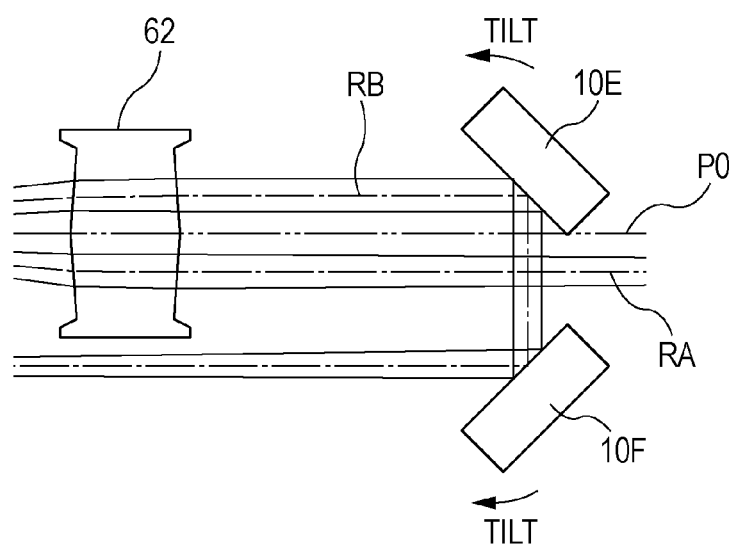

A comparative example of an imaging optical system using two mirrors 10E and 10F in place of the beam splitter 7 of the first embodiment is described next. FIG. 6A is a sub-scanning cross-sectional view of the optical scanning apparatus according to the comparative example. FIG. 6B is an enlarged sub-scanning cross-sectional view of the mirrors 10E and 10F and the vicinity thereof. Since the main scanning cross-sectional view is substantially the same as that of the first embodiment, the description thereof is not repeated.

In general, each of the mirrors 10E and 10F requires a thickness of at least 3 mm in order to maintain the reflective surface accuracy and the strength of the mirror. When the mirrors 10E and 10F that have their own thicknesses are used, the height of the housing 11 in the sub-scanning direction is greater than that of the first embodiment by 3.2 mm (H3=30.2 mm).

In addition, since the two mirrors are independently mounted in the housing 11, the sensitivity to the irradiation position of the scan line with respect to a tilt in the sub-scanning direction, which is difficult to precisely control, is made high. In contrast, unlike the example shown in FIG. 5C, since the mirrors can be independently moved for shift eccentricity, a variation in the irradiation position on one mirror does not increase a variation in the irradiation position on the other mirror and vice versa. This is an advantage of the comparative example.

However, back calculation of a shift amount and a tilt amount that causes the same variation in the irradiation position indicates that significantly high tilt eccentricity precision is required. For example, when a distance between the mirror and the photosensitive drum is 100 (mm) and a variation in the irradiation position is 0.1 (mm), the shift amount of the mirror 10F is about 0.1 (mm). In contrast, the tilt amount is Atan(0.1/100)=3.44 (min). If a mirror having a width of 8 mm in the sub-scanning direction is mounted in the housing, a variation in the irradiation position is 8 (mm)×tan{3.44 (min)}. That is, about ¹⁄₁₀-fold tilt eccentricity precision is required as compared with the shift eccentricity precision.

Accordingly, in order to reduce the variation in the irradiation position, it is significantly important to decrease the sensitivity to tilt eccentricity.

As in the first embodiment, by disposing two planar reflective surfaces so that the two planar reflective surfaces are perpendicular to each other and integrating the two planar reflective surfaces, the sensitivity of the tilt eccentricity with respect to the irradiation position can be made nearly zero. In addition, it is desirable that the angle formed by the two reflective flat surfaces be a right angle. However, if the angle is in the range from 75° to 105°, a variation in the irradiation position that causes a problem in a practical use does not occur.

According to the present embodiment, as described above, by separating and bending the optical path using a beam splitter, the height H of the optical scanning apparatus in the sub-scanning direction can be reduced as compared with that of existing optical scanning apparatuses including two mirrors (refer to FIGS. 9A and 9B) or three mirrors (refer to FIGS. 6A and 6B). In addition, an optical scanning apparatus having a low sensitivity to an irradiation position can be provided.

Second Embodiment

Figure 7A:
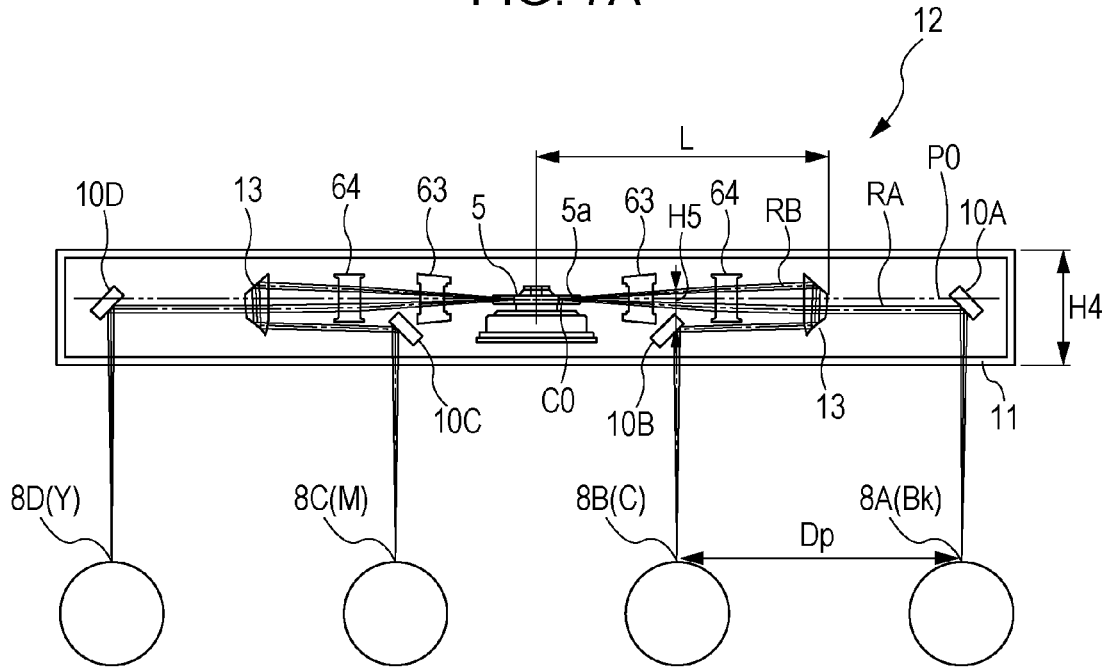
FIGS. 7A and 7B are a sub-scanning cross-sectional view of an optical scanning apparatus and an enlarged view of a main portion of the optical scanning apparatus according to a second embodiment of the present invention.
Figure 7B:
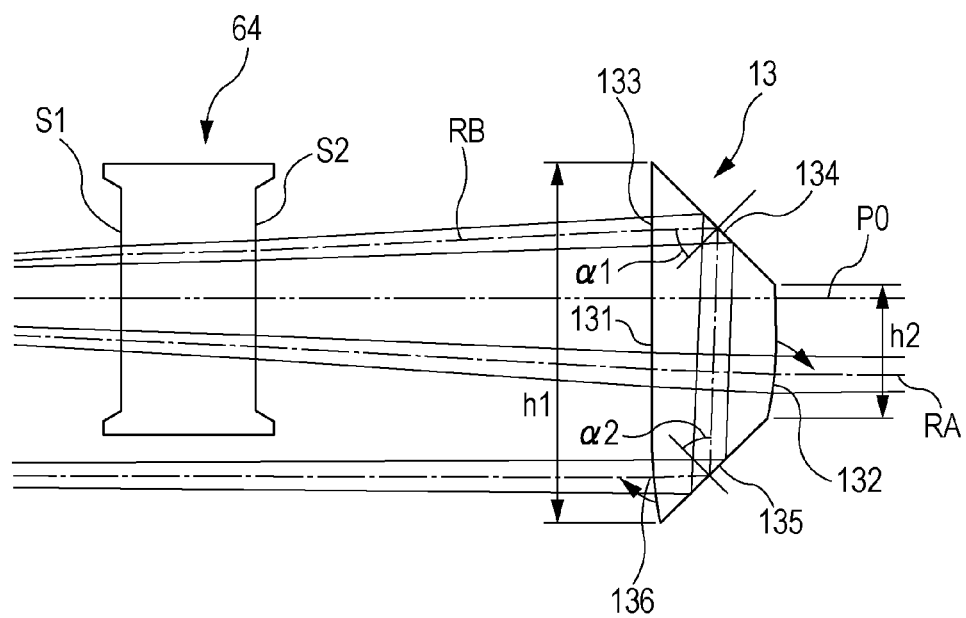

FIG. 7A is a sub-scanning cross-sectional view of an optical scanning apparatus according to a second embodiment of the present invention. H4 (mm) is the height of the optical scanning apparatus in the sub-scanning direction (Z direction). FIG. 7B is an enlarged view of a beam splitter 13 serving as a composite element and the vicinity thereof viewed in the sub-scanning direction. Surfaces S1 and S2 are the incident surface S1 and the emergent surface S2 of the image forming lens 64 for the light beams RA and RB.

The present embodiment differs from the above-described first embodiment in that each of a second transmissive surface (an emergent surface) 132 and a fourth transmissive surface (an emergent surface) 136 of the beam splitter 13 has a power in the sub-scanning direction.

As in the first embodiment, according to the present embodiment, a light beam is made incident on the deflection surface 5a in a direction perpendicular to the optical axis of the imaging optical system in the main scanning cross section. In addition, in the sub-scanning cross section, the light beam is diagonally made incident on the deflection surface 5a at a predetermined angle in the sub-scanning direction (an angle of 3° with respect to the normal line of the deflection surface 5a). As shown in FIG. 7B, an angle α1 formed by the light beam RB and the surface normal of a totally reflecting surface 134 is 42.97°. An angle α2 formed by the light beam RB and the surface normal of a totally reflecting surface 135 is 47.03°. Since the beam splitter 13 is made of a plastic material having an index of refraction of 1.52781, total reflection occurs when the incident angle relative to the reflecting surface is greater than or equal to 40.88°. In addition, the totally reflecting surfaces 134 and 135 are planar surfaces that are disposed so as to be perpendicular to each other.

Furthermore, the first transmissive surface and the third transmissive surface are integrated into one mirror surface (a planar surface). According to the present embodiment, a height h1 of the transmissive surface adjacent to the deflecting unit is 14.65 mm, and a height h2 of the transmissive surface adjacent to a surface to be scanned (the second transmissive surface) in the sub-scanning direction is 5.37 mm. Thus, conditional expression (1) is satisfied. If h1 is lower than or equal to the lower limit value, a problem of the light beam RA being too close to the light beam RB that has passed through the beam splitter occurs. In contrast, if h1 is higher than or equal to the higher limit value, the size of the beam splitter is increased and, therefore, the height of the optical scanning apparatus cannot be reduced.

In addition, a distance L between the second transmissive surface 72 of the beam splitter and the rotation axis of the light deflector in a direction perpendicular to the rotation axis of the beam splitter is 67.98 mm. A distance Dp between a first image forming point on the surface to be scanned 8A on which the image of the light beam RA that reaches the surface to be scanned that is physically distant from the deflection surface of the light deflector is formed and a second image forming point in the surface of the surface to be scanned 8B on which the image of the light beam RB that reaches the surface to be scanned that is physically close to the deflection surface of the beam splitter in a direction perpendicular to the rotation axis of the deflecting unit is 69 mm. Thus, conditional expression (2) is satisfied. If L is out of this range, an area occupied by the optical path above the surface of the inner photosensitive drum (an area indicated by H2 in FIG. 1A) is increased. Therefore, it is difficult to reduce the size of the optical scanning apparatus. In addition, the optical length of the light beam RA needs to be significantly different from the optical length of the light beam RB.

Characteristics related to the shape of a lens surface and the optical layout according to the present embodiment are shown in Table 2.

TABLE 2(A)

Design Data

| | | |
|---|---|---|
| Wavelength of Light Source | λ(nm) | 790 |
| Index of Refraction of Anamorphic Lens 3 | n3 | 1.52781 |
| Index of Refraction of Imaging Lens 63 | n61 | 1.52781 |
| Index of Refraction of Imaging Lens 64 | n62 | 1.52781 |
| Index of Refraction of Beam Splitter 7 | n7 | 1.52781 |
| Diameter of Aperture (Ellipse) | Y Direction (Main Scanning) | 2.304 |
| | Z Direction (Sub-Scanning) | 1.738 |
| Oblique-Incidence Angle in Main Scanning Direction (Degree) | | 90 |
| Oblique-Incidence Angle in Sub-Scanning Direction (Degree) | | −3 |
| Maximum Angle of Emergence of Light Beam (Degree) | | ±48.7 |
| Coordinates of Rotation Center of Polygon Mirror | X Direction | −5.761 |
| | Y Direction | 4.238 |
| Number of Facets of Polygon Mirror | | 4 |
| Diameter of Circumcircle of Polygon Mirror | | ϕ20 |
| Effective Scan Width | W | 210 |
| fθ Coefficient | κ rad/mm | 123.53 |
| Optical Layout | | |

| | X Direction | Y Direction | Z Direction |
|---|---|---|---|
| Light Source 1 | 0.000 | −113.844 | 5.966 |
| Incident Surface of Anamorphic Lens 3 | 0.000 | −73.899 | 3.873 |
| Emergent Surface of Anamorphic Lens 3 | 0.000 | −70.903 | 3.716 |
| Aperture | 0.000 | −69.904 | 3.664 |
| Incident Surface of Imaging Lens 63 | 15.853 | −0.144 | 0.000 |
| Emergent Surface of Imaging Lens 63 | 21.523 | −0.144 | 0.000 |
| Incident Surface of Imaging Lens 64 | 35.482 | −0.144 | 0.000 |
| Emergent Surface of Imaging Lens 64 | 41.042 | −0.144 | 0.000 |
| Incident Surface of Beam Splitter 13 | 57.219 | −0.144 | 0.000 |
| Emergent Surface of Beam Splitter 13 | 62.219 | −0.144 | 0.000 |
| Surface to Be Scanned 8 | 152.019 | −0.144 | 0.000 |

Lens Shape Data

| | Anamorphic Lens 3 | | Imaging Lens 63 | | Imaging Lens 64 | | Beam Splitter 13 | |
|---|---|---|---|---|---|---|---|---|
| | Incident Surface | Emergent Surface | Incident Surface | Emergent Surface | Incident Surface | Emergent Surface | Incident Surface | Emergent Surface |
| Main Scanning Direction | | | | | | | | |
| R | ∞ | 3.72900E+01 | −3.56757E+01 | −2.14670E+01 | −8.77061E+01 | −1.95393E+02 | ∞ | ∞ |
| K | | | −3.93348E+00 | −7.35234E−01 | −3.51016E+01 | 1.91909E+01 | | |
| B4u | | | −1.77297E−05 | 3.15158E−06 | −1.83339E−06 | −4.05608E−06 | | |
| B6u | | | −1.81516E−08 | −3.50110E−08 | 3.25170E−10 | 2.22317E−09 | | |
| B8u | | | | | −1.62290E−13 | −1.54015E−12 | | |
| B10u | | | | | 9.70944E−17 | 3.25143E−16 | | |
| B4l | | | −1.77297E−05 | 3.15158E−06 | −1.83339E−06 | −4.05608E−06 | | |
| B6l | | | −1.76217E−08 | −3.52930E−08 | 4.94466E−10 | 2.48182E−09 | | |
| B8l | | | | | 3.10511E−13 | −1.59964E−12 | | |
| B10l | | | | | −1.13959E−16 | 5.00890E−16 | | |
| C5 | −5.2506E−03 | | | | | | | |
| Sub-Scanning Direction | | | | | | | | |
| r | ∞ | 1.89760E+01 | ∞ | ∞ | ∞ | 6.36262E+02 | ∞ | −1.87948E+01 |
| D2u | | | | | | −6.06314E−06 | | 1.22709E−05 |
| D4u | | | | | | −7.24033E−09 | | −2.55086E−09 |

TABLE 2(A)-continued

| Design Data | | | |
|---|---|---|---|
| D6u | | 4.64082E−12 | 2.92284E−13 |
| D8u | | | −2.36568E−17 |
| D10u | | | |
| D2l | | −6.06314E−06 | 1.13038E−05 |
| D4l | | −2.95247E−09 | −2.12922E−09 |
| D6l | | 1.82507E−12 | 1.26032E−13 |
| D8l | | | 1.12171E−17 |
| D10l | | | |
| M0_1u | | | −5.96605E−02 |
| M2_1u | | | 1.07798E−05 |
| M4_1u | | | −2.76628E−09 |
| M6_1u | | | 2.47201E−13 |
| M8_1u | | | |
| M10_1u | | | |
| M0_1l | | | −5.96605E−02 |
| M2_1l | | | 1.07798E−05 |
| M4_1l | | | −2.76628E−09 |
| M6_1l | | | 2.47201E−13 |
| M8_1l | | | |
| M10_1l | | | |
| C3 | −5.6520E−03 | | |

TABLE 2(B)

| Design Data | | |
|---|---|---|
| Wavelength of Light Source | λ(nm) | 790 |
| Index of Refraction of Anamorphic Lens 3 | n3 | 1.52781 |
| Index of Refraction of Imaging Lens 63 | n61 | 1.52781 |
| Index of Refraction of Imaging Lens 64 | n62 | 1.52781 |
| Index of Refraction of Beam Splitter 7 | n7 | 1.52781 |
| Diameter of Aperture (Ellipse) | Y Direction (Main Scanning) | 2.303 |
| | Z Direction (Sub-Scanning) | 1.455 |
| Oblique-Incidence Angle in Main Scanning Direction (Degree) | | 90 |
| Oblique-Incidence Angle in Sub-Scanning Direction (Degree) | | 3 |
| Maximum Angle of Emergence of Light Beam (Degree) | | ±48.7 |
| Coordinates of Rotation Center of Polygon Mirror | X Direction | −5.761 |
| | Y Direction | 4.238 |
| Number of Facets of Polygon Mirror | | 4 |
| Diameter of Circumcircle of Polygon Mirror | | φ20 |
| Effective Scan Width | W | 210 |
| fθ Coefficient | κ rad/mm) | 123.53 |
| Optical Layout | | |

| | X Direction | Y Direction | Z Direction |
|---|---|---|---|
| Light Source 1 | 0.000 | −113.844 | −5.966 |
| Incident Surface of Anamorphic Lens 3 | 0.000 | −73.899 | −3.873 |
| Emergent Surface of Anamorphic Lens 3 | 0.000 | −70.903 | −3.716 |
| Aperture | 0.000 | −69.904 | −3.664 |
| Incident Surface of Imaging Lens 63 | 15.853 | −0.144 | 0.000 |
| Emergent Surface of Imaging Lens 63 | 21.523 | −0.144 | 0.000 |
| Incident Surface of Imaging Lens 64 | 35.482 | −0.144 | 0.000 |
| Emergent Surface of Imaging Lens 64 | 41.042 | −0.144 | 0.000 |
| Incident Surface of Beam Splitter 13 | 57.219 | −0.144 | 0.000 |
| Emergent Surface of Beam Splitter 13 | 72.219 | −0.144 | 0.000 |
| Surface to Be Scanned 8 | 155.497 | −0.144 | 0.000 |
| Lens Shape Data | | | |

Lens Shape Data

| | Anamorphic Lens 3 | | Imaging Lens 63 | | Imaging Lens 64 | | Beam Splitter 13 | |
|---|---|---|---|---|---|---|---|---|
| | Incident Surface | Emergent Surface | Incident Surface | Emergent Surface | Incident Surface | Emergent Surface | Incident Surface | Emergent Surface |
| Main Scanning Direction | | | | | | | | |
| R | ∞ | 3.69000E+01 | −3.56757E+01 | −2.14670E+01 | −8.77061E+01 | −1.95393E+02 | ∞ | ∞ |
| K | | | −3.93348E+00 | −7.35234E−01 | −3.51016E+01 | 1.91909E+01 | | |
| B4u | | | −1.77297E−05 | 3.15158E−06 | −1.83339E−06 | −4.05608E−06 | | |
| B6u | | | −1.81516E−08 | −3.50110E−08 | 3.25170E−10 | 2.22317E−09 | | |
| B8u | | | | | −1.62290E−13 | −1.54015E−12 | | |
| B10u | | | | | 9.70944E−17 | 3.25143E−16 | | |
| B4l | | | −1.77297E−05 | 3.15158E−06 | −1.83339E−06 | −4.05608E−06 | | |

TABLE 2(B)-continued

Design Data

| | | | | | | | | |
|---|---|---|---|---|---|---|---|---|
| B6l | | | −1.76217E−08 | −3.52930E−08 | 4.94466E−10 | 2.48182E−09 | | |
| B8l | | | | | 3.10511E−13 | −1.59964E−12 | | |
| B10l | | | | | −1.13959E−16 | 5.00890E−16 | | |
| C5 | −5.2506E−03 | | | | | | | |
| Sub-Scanning Direction | | | | | | | | |
| r | ∞ | 1.89760E+01 | ∞ | ∞ | ∞ | 6.36262E+02 | ∞ | −1.95006E+01 |
| D2u | | | | | | −6.06314E−06 | | 9.63457E−06 |
| D4u | | | | | | −7.24033E−09 | | −1.80913E−09 |
| D6u | | | | | | 4.64082E−12 | | 2.29709E−13 |
| D8u | | | | | | | | −2.06769E−17 |
| D10u | | | | | | | | |
| D2l | | | | | | −6.06314E−06 | | 8.95358E−06 |
| D4l | | | | | | −2.95247E−09 | | −1.51346E−09 |
| D6l | | | | | | 1.82507E−12 | | 1.06715E−13 |
| D8l | | | | | | | | 1.22757E−18 |
| D10l | | | | | | | | |
| M0_1u | | | | | | | | 6.70558E−02 |
| M2_1u | | | | | | | | −1.12924E−05 |
| M4_1u | | | | | | | | 2.80555E−09 |
| M6_1u | | | | | | | | −2.73826E−13 |
| M8_1u | | | | | | | | |
| M10_1u | | | | | | | | |
| M0_1l | | | | | | | | 6.70558E−02 |
| M2_1l | | | | | | | | −1.12924E−05 |
| M4_1l | | | | | | | | 2.80555E−09 |
| M6_1l | | | | | | | | −2.73826E−13 |
| M8_1l | | | | | | | | |
| M10_1l | | | | | | | | |
| C3 | −5.6520E−03 | | | | | | | |

According to the present embodiment, each of a second transmissive surface (an emergent surface) 132 and a fourth transmissive surface (an emergent surface) 136 of the beam splitter 13 has a power in the sub-scanning direction. Accordingly, the image forming lens 61 is formed from a cylindrical surface having a power in only the main scanning direction, and the image forming lens 62 is formed from a normal toric surface having surface vertexes of the incident surface and emergent surface in the sub-scanning direction in a plane P0. Such a configuration facilitates molding of the image forming lens and reduces the cost of the optical components.

Furthermore, since each of a second transmissive surface (an emergent surface) 132 and a fourth transmissive surface (an emergent surface) 136 of the beam splitter 13 has a power in the sub-scanning direction, the imaging magnification factor in the sub-scanning direction can be decreased. For the imaging optical system SA, βa=−1.51. For the imaging optical system SB, βb=−1.27. Thus, these values are smaller than those of the first embodiment. If the imaging magnification factor in the sub-scanning direction is decreased, the sensitivity to a pitch variation due a plane tilt and face eccentricity of the deflection surface can be advantageously reduced.

Although the optical performance according to the present embodiment (i.e., the field curvature dm in the main scanning direction, the field curvature ds in the sub scanning direction, the fθ characteristic, a scan line curvature, the uniformity of the imaging magnification factor in the sub-scanning direction, and the shape of a spot) is not shown, the optical performance is corrected to a level at which the optical scanning apparatus can be used for color image forming apparatuses without any problems. According to the present embodiment, by changing the tilt angles of the second transmissive surface (an emergent surface) 132 and the fourth transmissive surface (an emergent surface) 136 of the beam splitter 13 in the sub-scanning direction (the tilt amounts in the sagittal direction) along the main scanning direction, spot rotation caused by twisting of the wavefront aberration and the scan line curvature can be excellently corrected at the same time.

Figure 10B:
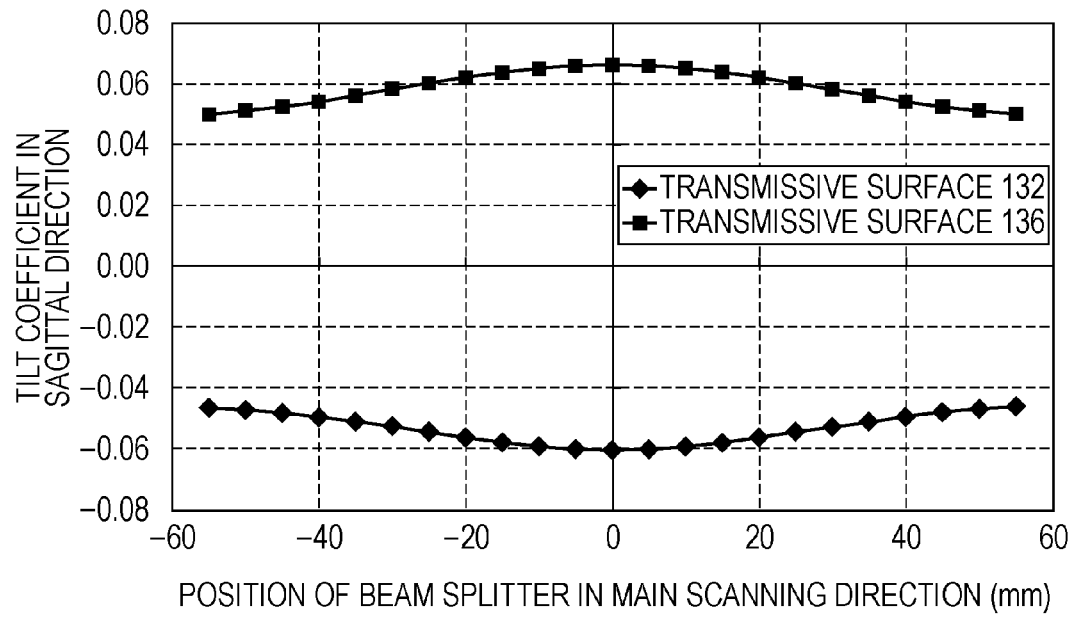

That is, as shown in FIGS. 10A and 10B, the second transmissive surface 132 and the fourth transmissive surface 136 have a changed tilt coefficient in the sagittal direction (the first-order term of Z shown in [Math. 2]). As indicated by the graph, the sagittal tilt coefficient of the transmissive surface 132 on the optical axis is −0.0597, and the sagittal tilt coefficient of the transmissive surface 136 on the optical axis is 0.0671. These values correspond to the tilt angles of −3.41° and 3.84°. As shown in FIG. 7B, as a relationship between the tilt direction and the sign of the coefficient, the coefficient indicates a positive direction when the surface is tilted towards a direction indicated by the arrow. As each of the transmissive surfaces 132 and 136 moves away from the optical axis in the main scanning direction, the absolute value of the coefficient gradually decreases.

According to the present embodiment, since the power in the sub-scanning direction is converged on the emergent surface of the beam splitter 13, the imaging magnification factor in the sub-scanning direction can be decreased. That is, the diameter of the light beam that travels in the sub-scanning direction and that passes through image forming lenses 63 and 64 can be reduced, and the effect of twisting of the wavefront aberration occurring when the light beam passes through the image forming lenses can be reduced from that of the first embodiment. Accordingly, the number of the surfaces for changing the sagittal tilt amount can be reduced to one.

Third Embodiment

Figure 8:
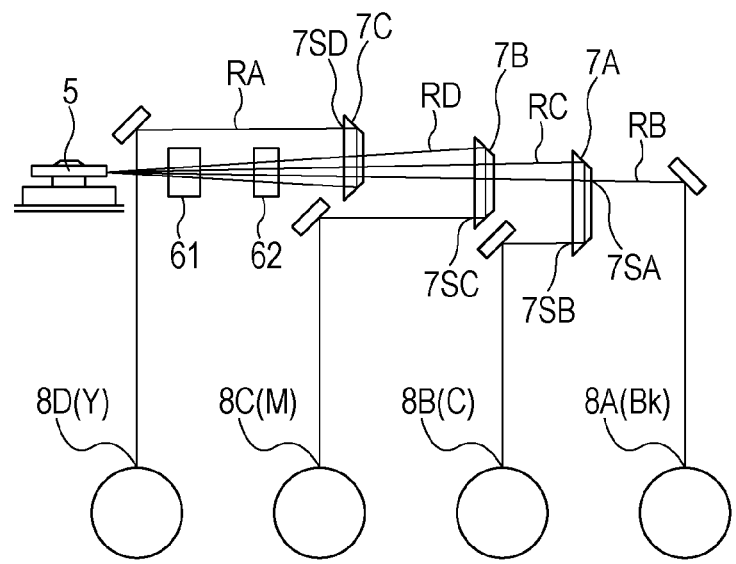
FIG. 8 is a sub-scanning cross-sectional view of an optical scanning apparatus according to a third embodiment of the present invention.

FIG. 8 is a sub-scanning cross-sectional view of an optical scanning apparatus according to a third embodiment of the present invention.

The present embodiment differs from the above-described first embodiment in that four light beams are made incident on the deflection surface 5a of the light deflector 5 and four light beams are deflected for scanning on one side of the light deflector. Accordingly, a beam splitter serving as an integrated composite element includes an element 7A for separating a light beam RC from the light beams RB, an element 7B for separating a light beam RD from the light beams RB and RC, and an element 7C for separating a light beam RA from the light beams RB, RC, and RD.

In addition, according to the present embodiment, the optical path lengths from the image forming lenses 61 and 62 to the photosensitive drums 8A, 8B, 8C, and 8D are long. Accordingly, if the power in the sub-scanning direction is concentrated on the image forming lens, the imaging magnification factor in the sub-scanning direction is disadvantageously increased. Therefore, according to the present embodiment, it is desirable that the power be concentrated on transmissive surfaces 7SA, 7SB, 7SC, and 7SD of the beam splitter 7A, 7B, and 7C so that the sub-scanning imaging magnification factor is reduced.

According to the present invention, an advantage in that the height of the apparatus in a sub-scanning direction is decreased even for the optical path traveling towards an inner photosensitive drum can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/069570, filed Nov. 18, 2009, hereby incorporated by reference herein in its entirety.

REFERENCE SIGNS LIST 1 light source unit (semiconductor laser)
3 anamorphic lens
5 deflecting unit (polygon mirror)
61, 62 imaging optical element (image forming lens)
7, 13 beam splitter
8 surface to be scanned (surface of photosensitive drum)
LA, LB incident optical system
SA, SB imaging optical system

The invention claimed is:

1. An optical scanning apparatus comprising:
two light source units configured to emit a plurality of light beams;
a deflecting unit having a deflection surface and configured to deflect and scan the plurality of light beams with the same deflection surface;
two imaging optical systems configured to form images of the light beams emitted from the two light source units and deflected by the same deflection surface of the deflecting unit, the images being formed on two surfaces to be scanned each corresponding to one of the two light source units; and
a beam splitter disposed between the deflection surface and the two surfaces to be scanned so as to straddle the light beams emitted from the two light source units and deflected by the same deflection surface of the deflecting unit;
wherein the beam splitter serves as a composite element including first and second reflective surfaces and including first, second, third and fourth transmissive surfaces integrated therein,
wherein a light beam that reaches a surface to be scanned located at a position physically far from the deflection surface of the deflecting unit passes through the first transmissive surface and the second transmissive surface of the beam splitter in this order, and a light beam that reaches a surface to be scanned located at a position physically close to the deflection surface of the deflecting unit passes through the third transmissive surface, the first reflective surface, the second reflective surface, and the fourth transmissive surface of the beam splitter in this order, and
wherein an optical path between the first reflective surface and the second reflective surface for the light beam reaching the surface to be scanned located at the position physically close to the deflection surface of the deflecting unit intersects with an optical path between the first transmissive surface and the second transmissive surface for the light beam reaching the surface to be scanned located at the position physically far from the deflection surface of the deflecting unit in a sub-scanning cross section in the beam splitter.

2. The optical scanning apparatus according to claim 1, wherein a condition:

$$2.5 \times h2 < h1 < 4.5 \times h2$$

is satisfied, where h1 represents a width of a transmissive surface of a beam splitter formed from the first transmissive surface, the third transmissive surface, and the fourth transmissive of the beam splitter in the sub-scanning direction, the transmissive surface being adjacent to the deflecting unit, and h2 represents a width of a transmissive surface of a beam splitter formed from the second transmissive surface of the beam splitter in the sub-scanning direction, the transmissive surface being adjacent to the surface to be scanned.

3. The optical scanning apparatus according to claim 1, wherein a condition:

$$0.9 \times Dp < L < 1.1 \times Dp$$

is satisfied, where L represents a distance between the second transmissive surface of the beam splitter and a rotation axis of the deflecting unit in a direction perpendicular to the rotation axis of the deflecting unit in the sub-scanning cross section, and Dp represents a distance between a first image point and a second image point in a direction perpendicular to the rotation axis of the deflecting unit, the first image point being an image point of a light beam reaching the surface to be scanned that is far from the deflection surface of the deflecting unit on the surface to be scanned and a second image point being an image point of a light beam reaching the surface to be scanned that is close to the deflection surface of the deflecting unit on the surface to be scanned.

4. The optical scanning apparatus according to claim 1, wherein the two reflective surfaces of the beam splitter are planar, and an angle formed by the two reflective surfaces of the beam splitter is a right angle in the sub-scanning cross section.

5. The optical scanning apparatus according to claim 1, wherein a light beam reflected by the first reflective surface of the beam splitter travels in a direction toward a driving unit configured to drive the deflecting unit in the sub-scanning cross section.

6. A color image forming apparatus comprising:
the optical scanning apparatus according to claim 1; and
a plurality of photosensitive drums each disposed on one of the surfaces to be scanned.

7. An optical scanning apparatus comprising:
a plurality of light source units;

a deflecting unit configured to deflect and scan a plurality of light beams emitted from the plurality of light source units by the same deflection surface;

a plurality of imaging optical systems each corresponding to one of the plurality of light source units, the imaging optical systems forming, on a plurality of surfaces to be scanned each corresponding to one of the light source units, images of the light beams deflected for scanning by the same deflection surface of the deflecting unit; and a beam splitter disposed on the plurality of optical paths between the deflection surface of the deflecting unit and each of the surfaces to be scanned so as to straddle the plurality of light beams emitted from the light source unit and deflected by the same deflection surface of the deflecting unit;

wherein the beam splitter serves as a composite element including a transmissive surface that allows a light beam reaching a surface to be scanned located at a position physically the farthest from the deflection surface of the deflecting unit to pass therethrough and a plurality of reflective surfaces that reflect light beams reaching the surfaces to be scanned that are physically closer to the deflection surface of the deflecting unit than the surface to be scanned located at the position physically the farthest from the deflection surface of the deflecting unit, and the transmissive surface is disposed between the reflective surfaces in a sub-scanning cross section in the sub-scanning direction, and wherein an optical path of the light beams reaching the surfaces to be scanned that are physically closer to the deflection surface of the deflecting unit than the surface to be scanned located at the position physically the farthest from the deflection surface of the deflecting unit between the reflective surfaces intersects with an optical path of the light beam reaching the surface to be scanned located at a position physically the farthest from the deflection surface of the deflecting unit between the deflection surface and the transmissive surface in the sub-scanning cross section in the beam splitter.

8. The optical scanning apparatus according to claim 7, further comprising:

at least one beam splitter disposed so as to straddle the plurality of optical paths between the plurality of light beams deflected for scanning by the same deflection surface of the deflecting unit and the surfaces to be scanned each corresponding to one of the light beams, the beam splitter serving as a composite element including two reflective surfaces and four transmissive surfaces;

wherein a light beam reaching a surface to be scanned located at a position physically the farthest from the deflection surface of the deflecting unit passes through the beam splitter via a first transmissive surface and a second transmissive surface in this order, and wherein a light beam reaching the surface to be scanned that is physically closer to the deflection surface of the deflecting unit than the surface to be scanned located at the position physically the farthest from the deflection surface of the deflecting unit passes through the beam splitter via a third transmissive surface, a first reflective surface, a second reflective surface, and a fourth transmissive surface in this order, and wherein an optical path of the light beams reaching the surfaces to be scanned that are physically closer to the deflection surface of the deflecting unit than the surface to be scanned located at the position physically the farthest from the deflection surface of the deflecting unit between the first reflective surface and the second refractive surface intersects with an optical path of the light beam reaching the surface to be scanned located at a position physically the farthest from the deflection surface of the deflecting unit between the first transmissive surface and the second transmissive surface in the sub-scanning cross section in the beam splitter.

9. A color image forming apparatus comprising:

the optical scanning apparatus according to claims 7; and a plurality of photosensitive drums each disposed on one of the surfaces to be scanned.

* * * * *